US010715072B2

(12) United States Patent
Smolenaers

(10) Patent No.: US 10,715,072 B2
(45) Date of Patent: Jul. 14, 2020

(54) CONTROLLER FOR AN INDUCTIVE LOAD HAVING ONE OR MORE INDUCTIVE WINDINGS

(71) Applicant: InvertedPower Pty Ltd, Heidelberg West, Victoria (AU)

(72) Inventor: Stefan Smolenaers, Heidelberg West (AU)

(73) Assignee: InvertedPower Pty Ltd, Heidelberg West (AU)

( * ) Notice: Subject to any disclaimer, the term of this patent is extended or adjusted under 35 U.S.C. 154(b) by 0 days.

(21) Appl. No.: 15/758,694

(22) PCT Filed: Sep. 12, 2016

(86) PCT No.: PCT/AU2016/050852
§ 371 (c)(1),
(2) Date: Mar. 8, 2018

(87) PCT Pub. No.: WO2017/041144
PCT Pub. Date: Mar. 16, 2017

(65) Prior Publication Data
US 2018/0254732 A1    Sep. 6, 2018

(30) Foreign Application Priority Data

Sep. 11, 2015   (AU) ................. 2015903706

(51) Int. Cl.
*H02P 27/08* (2006.01)
*H02J 1/12* (2006.01)
(Continued)

(52) U.S. Cl.
CPC .............. *H02P 27/08* (2013.01); *B60L 53/24* (2019.02); *H02J 1/12* (2013.01); *H02J 7/022* (2013.01);
(Continued)

(58) Field of Classification Search
CPC .. H02J 3/38; H02J 3/383; H02S 40/32; B23K 11/24; B60L 53/22; B60L 53/24; B60L 7/06; B60L 7/22
(Continued)

(56) References Cited

U.S. PATENT DOCUMENTS 4,258,304 A    3/1981  Bourke
4,536,696 A    8/1985  Ray
(Continued)

FOREIGN PATENT DOCUMENTS

CN    101633309 A    1/2010
CN    201639546 U    11/2010
(Continued)

OTHER PUBLICATIONS

Liu, T. et al., "Implementation of an Integrated Battery-Charger for an Electric-Propulsion System," Proceedings of the 40th Annual Conference of the IEEE Industrial Electronics Society (IECON 2014), Oct. 29, 2014, Dallas, Texas, 6 pages.
(Continued)

*Primary Examiner* — Rexford N Barnie
*Assistant Examiner* — Jagdeep S Dhillon
(74) *Attorney, Agent, or Firm* — McCoy Russell LLP

(57) ABSTRACT

The invention is to a controller for a DC electric motor having a first drive circuit and a second drive circuit that operate in a first state and a second state wherein, in the first state, circuits are connected with terminals input and are responsive to the control signals for receiving a load current and selectively energising winding to create torque in motor. In the second state, circuit is disconnected from terminal such that: circuit is able to be responsive to current for generating a first DC charging current to batteries; and circuit is able to connect with a terminal and be responsive
(Continued)

US 10,715,072 B2

Page 2 to a second DC charging current for selectively directing an energizing current through winding.

15 Claims, 15 Drawing Sheets

(51) Int. Cl.
| | |
|---|---|
| B60L 53/24 | (2019.01) |
| H02J 7/14 | (2006.01) |
| H02P 25/22 | (2006.01) |
| H02J 1/10 | (2006.01) |
| B60L 50/51 | (2019.01) |
| H02P 27/06 | (2006.01) |
| H02J 7/02 | (2016.01) |
| H02J 7/34 | (2006.01) |

(52) U.S. Cl.
CPC ............ *H02J 7/1423* (2013.01); *H02P 25/22* (2013.01); *H02P 27/06* (2013.01); *B60L 50/51* (2019.02); *H02J 1/10* (2013.01); *H02J 7/345* (2013.01); *Y02T 10/642* (2013.01); *Y02T 10/7005* (2013.01); *Y02T 10/7072* (2013.01); *Y02T 90/127* (2013.01); *Y02T 90/14* (2013.01)

(58) Field of Classification Search
USPC ........... 307/10.1, 9.1, 66, 64, 80, 82, 86, 43; 323/318, 316, 311
See application file for complete search history.

(56) References Cited

U.S. PATENT DOCUMENTS

| | | |
|---|---|---|
| 4,920,475 A | 4/1990 | Rippel |
| 5,017,800 A | 5/1991 | Divan |
| 5,099,186 A | 3/1992 | Rippel et al. |
| 5,182,508 A | 1/1993 | Schauder |
| 5,235,504 A | 8/1993 | Sood |
| 5,291,388 A | 3/1994 | Heinrich |
| 5,341,075 A | 8/1994 | Cocconi |
| 5,373,195 A | 12/1994 | De Doncker et al. |
| 5,412,557 A | 5/1995 | Lauw |
| 5,500,579 A | 3/1996 | Kim et al. |
| 5,504,414 A | 4/1996 | Kinoshita |
| 5,546,295 A | 8/1996 | Prete et al. |
| 5,583,385 A | 12/1996 | Horie et al. |
| 5,642,270 A | 6/1997 | Green et al. |
| 5,717,303 A | 2/1998 | Engel |
| 5,734,237 A | 3/1998 | Engel |
| 5,875,106 A | 2/1999 | Tenconi et al. |
| 6,002,603 A | 12/1999 | Carver |
| 6,031,738 A | 2/2000 | Lipo et al. |
| 6,496,393 B1 | 12/2002 | Patwardhan |
| 6,608,396 B2 | 8/2003 | Downer et al. |
| 6,724,100 B1 | 4/2004 | Gabriel |
| 6,822,866 B2 | 11/2004 | Fearing et al. |
| 7,012,822 B2 | 3/2006 | Zhu et al. |
| 7,327,113 B2 | 2/2008 | Steigerwald et al. |
| 7,443,125 B2 | 10/2008 | Clothier et al. |
| 7,595,606 B2 | 9/2009 | Loubeyre |
| 7,832,513 B2 | 11/2010 | Verbrugge et al. |
| 7,859,201 B2 | 12/2010 | Oyobe et al. |
| 7,977,819 B2 | 7/2011 | Kitanaka |
| 8,080,973 B2 | 12/2011 | King et al. |
| 8,098,056 B2 | 1/2012 | Yamazaki et al. |
| 8,138,694 B2 | 3/2012 | Steigerwald et al. |
| 8,143,856 B2 | 3/2012 | Andrea et al. |
| 8,217,616 B2 | 7/2012 | Rozman et al. |
| 8,232,669 B2 | 7/2012 | Chen et al. |
| 8,299,739 B2 | 10/2012 | Kakebayashi et al. |
| 8,395,910 B2 | 3/2013 | Alexander |
| 8,405,327 B2 | 3/2013 | Liang et al. |
| 8,415,904 B2 | 4/2013 | Rippel |
| 8,421,271 B2 | 4/2013 | King et al. |
| 8,432,126 B2 | 4/2013 | Hasan et al. |
| 8,466,652 B2 | 6/2013 | Klaes |
| 8,547,051 B2 | 10/2013 | Green et al. |
| 8,638,069 B2 | 1/2014 | Krauer |
| 8,653,696 B2 | 2/2014 | King et al. |
| 8,736,203 B2 | 5/2014 | Jang et al. |
| 8,772,984 B2 | 7/2014 | Chang |
| 8,847,555 B2 | 9/2014 | Loudot et al. |
| 8,963,365 B2 | 2/2015 | King et al. |
| 9,000,740 B2 | 4/2015 | Touzani et al. |
| 9,018,809 B2 | 4/2015 | Rippel et al. |
| 9,045,046 B2 | 6/2015 | Januschevski et al. |
| 9,312,692 B2 | 4/2016 | Feuerstack et al. |
| 9,457,672 B2 | 10/2016 | Chang |
| 10,097,078 B2 | 10/2018 | Rayner et al. |
| 10,498,221 B2 | 12/2019 | Rayner et al. |
| 2002/0158606 A1 | 10/2002 | King |
| 2002/0185989 A1 | 12/2002 | Rahman et al. |
| 2004/0062059 A1 | 4/2004 | Cheng et al. |
| 2006/0226703 A1 | 10/2006 | Schreiber |
| 2007/0029986 A1* | 2/2007 | Nakamura ................ B60L 7/06 323/318 |
| 2007/0247104 A1* | 10/2007 | Garza ..................... H02P 27/16 318/807 |
| 2008/0238372 A1 | 10/2008 | Cintra et al. |
| 2010/0045248 A1 | 2/2010 | Hawley |
| 2010/0244775 A1 | 9/2010 | Smith |
| 2012/0019212 A1 | 1/2012 | Krauer |
| 2012/0049820 A1 | 3/2012 | Moussaoui et al. |
| 2012/0062176 A1 | 3/2012 | Hasan et al. |
| 2012/0181975 A1 | 7/2012 | Loudot et al. |
| 2012/0274246 A1 | 11/2012 | Radulescu |
| 2012/0286740 A1 | 11/2012 | Loudot et al. |
| 2013/0020993 A1 | 1/2013 | Taddeo et al. |
| 2013/0193276 A1* | 8/2013 | Hunter .................. B61L 25/025 246/122 R |
| 2013/0214729 A1 | 8/2013 | Gati et al. |
| 2013/0293163 A1 | 11/2013 | Flett |
| 2013/0320912 A1 | 12/2013 | Feuerstack et al. |
| 2014/0062394 A1 | 3/2014 | Khan et al. |
| 2014/0191582 A1* | 7/2014 | Deboy .................... H02J 3/383 307/82 |
| 2014/0232301 A1 | 8/2014 | Dittmer et al. |
| 2014/0265971 A1 | 9/2014 | Taube et al. |
| 2015/0008748 A1* | 1/2015 | Deboy .................... H02J 3/383 307/77 |
| 2015/0015072 A1* | 1/2015 | Deboy .................. H02M 7/537 307/52 |
| 2015/0016159 A1* | 1/2015 | Deboy .................... H02J 3/383 363/71 |
| 2015/0042159 A1 | 2/2015 | Kim et al. |
| 2015/0069934 A1* | 3/2015 | Gardner ................ B41J 2/04548 318/116 |
| 2015/0069936 A1 | 3/2015 | Jang et al. |
| 2015/0146457 A1* | 5/2015 | Strijker ................ H02M 3/1588 363/21.14 |

FOREIGN PATENT DOCUMENTS

| | | |
|---|---|---|
| CN | 102390272 A | 3/2012 |
| CN | 102457182 A | 5/2012 |
| CN | 102826054 A | 12/2012 |
| CN | 202634360 U | 12/2012 |
| CN | 203032409 U | 7/2013 |
| CN | 203211118 U | 9/2013 |
| CN | 103647465 A | 3/2014 |
| CN | 103647483 A | 3/2014 |
| CN | 203708127 U | 7/2014 |
| CN | 203708154 U | 7/2014 |
| CN | 204290428 U | 4/2015 |
| DE | 4013506 A1 | 10/1991 |
| DE | 102012201617 A1 | 8/2013 |
| EP | 0593472 B1 | 4/1995 |
| EP | 0834977 A2 | 4/1998 |
| EP | 1657807 A2 | 5/2006 |
| EP | 2406098 B1 | 8/2013 |
| FR | 2720201 A1 | 11/1995 |
| FR | 2738964 A1 | 3/1997 |

(56) References Cited

FOREIGN PATENT DOCUMENTS

| IN | 01381MU2013 A | 4/2015 |
|---|---|---|
| JP | H06133564 A | 5/1994 |
| JP | H06292304 A | 10/1994 |
| JP | 2002176704 A | 6/2002 |
| JP | 2014103752 A | 6/2014 |
| MY | 149800 A | 10/2013 |
| WO | 9301650 A1 | 1/1993 |
| WO | 2004009397 A1 | 1/2004 |
| WO | 2011159241 A1 | 12/2011 |
| WO | 2013029891 A2 | 3/2013 |
| WO | 2014177803 A2 | 11/2014 |
| WO | 2015024508 A1 | 2/2015 |

OTHER PUBLICATIONS

Liu, T. et al., "Integrated battery charger with power factor correction for electric-propulsion systems," IET Electric Power Applications, vol. 9, No. 3, Mar. 9, 2015, 10 pages.

European Patent Office, Extended European Search Report Issued in Application No. 16843306.8, dated Dec. 17, 2018, Germany, 13 pages.

ISA Australian Patent Office, International Search Report Issued in Application No. PCT/AU2016/050852, dated Dec. 5, 2016, WIPO, 3 pages.

\* cited by examiner

CONTROLLER FOR AN INDUCTIVE LOAD HAVING ONE OR MORE INDUCTIVE WINDINGS

CROSS-REFERENCE TO RELATED APPLICATIONS

The present application is a U.S. National Phase of International Patent Application Serial No. PCT/AU2016/050852, entitled "A CONTROLLER FOR AN INDUCTIVE LOAD HAVING ONE OR MORE INDUCTIVE WINDINGS," filed on Sep. 12, 2016. International Patent Application Serial No. PCT/AU2016/050852 claims priority to Australian Patent Application No. 2015903706, filed on Sep. 11, 2015. The entire contents of each of the above-cited applications are hereby incorporated by reference in their entirety for all purposes.

FIELD OF THE INVENTION

The present invention relates to a controller for an inductive load and in particular to a controller for an inductive load having one or more inductive windings.

The invention has been developed primarily for use in plug-in electric vehicles and will be described hereinafter with reference to that application. However, it will be appreciated that the invention is not limited to these particular fields of use and is also applicable to other vehicular uses such as plug-in hybrid electric vehicles whether for private or commercial use. The invention is also applicable to non-vehicle uses such as pumps, compressors, and many other applications of electric motors or inductive loads in many different industries.

BACKGROUND

Any discussion of the background art throughout the specification should in no way be considered as an admission that such art is widely known or forms part of common general knowledge in the field.

Electric vehicles have been available for many decades and make use of one or more electric motors to provide locomotive drive for the vehicle. In more recent times this form of vehicle is becoming increasingly more viable as cars for private and commercial use. Electric vehicles offer many advantages over vehicles with an internal combustion engine (ICE) and hybrid ICE/electric motor vehicles. However, the major disadvantage or drawback of electric vehicles remains: the range that is available between recharging is relatively short, and the charging time, particularly to obtain a full charge, is long relative to the refuelling time for a car with an ICE.

To encourage the sale and use of electric vehicles at least one electric vehicle manufacturer is making efforts to have purpose-built rapid charging stations constructed in a number of different locations in different countries. This however remains a very expensive infrastructure-based solution that will take considerable time to meaningfully deploy.

The requirement for purpose-built charging stations and other infrastructure to reduce the duration of the recharge time for electric vehicles arises partly from the installation within such vehicles of recharging circuitry that is only capable of accommodating relatively low power levels. One factor contributing to the inclusion of this lower power circuitry in the vehicles is to reduce the cost of manufacture of the vehicles. However, other motivations are to reduce the weight and size of the vehicles. For high power components, and the need to keep those components within acceptable operating temperature ranges, consumes considerable space and adds considerable weight, both of which diminish vehicle performance and range. Additionally, the weight of the recharging components can be considered dead weight whilst driving, as it is only used when the vehicle is stationary and not operating.

One partial solution that has been proposed to this problem is to include in an electric vehicle a power conversion device that is a drive circuit for the electric motor and a charging circuit for the on-board battery. An example of such a power conversion device is disclosed in Chinese utility patent CN 203708127, where use is made of all three of the motor windings of a switched reluctance motor for charging the battery from an AC source. This prior art arrangement is however limited in operation and application. By way of example, it is through its architecture limited to: an AC input for charging; and a switched reluctance motor. Moreover, it is not able to gain the benefits of scale, in that where use is made of multiple motors there is also a need to make use of multiple versions of the conversion device.

Accordingly, there is a need in the art for an improved controller for an inductive load having one or more inductive windings and a controller for such a load.

SUMMARY OF THE INVENTION

It is an object of the present invention to overcome or ameliorate at least one of the disadvantages of the prior art, or to provide a useful alternative.

According to a first aspect of the invention there is provided a controller for an inductive load having one or more inductive windings, the controller including:
a first input for drawing a DC load current from a first energy source during a first period and for supplying a first DC charging current to the first energy source during a second period;
a second input for drawing a second DC charging current from a second energy source during the second period;
  a control module for issuing control signals; and
  a first drive circuit and a second drive circuit that operate in a first state and a second state during the first period and the second period respectively wherein, in the first state, the drive circuits are connected with the first input and are responsive to the control signals for receiving the load current and selectively energising at least one of the one or more windings and wherein, in the second state, the second drive circuit is disconnected from the first input and the first and second drive circuits are responsive to the control signals such that:
  (a) the second drive circuit is able to connect with the second input and be responsive to the second charging current for selectively directing an energizing current through at least one of the one or more windings; and
  (b) the first drive circuit is able to be responsive to the energising current for generating the first DC charging current.

In an embodiment the first drive circuit and the second drive circuit include respective power rails and the controller includes a switching device for selectively connecting and disconnecting the power rails in the drive circuits to and from each other.

In an embodiment the first drive circuit and the second drive circuit include respective pairs of like power rails and the switching device selectively connects and disconnects the like power rails in the drive circuits to and from each other.

In an embodiment the respective pairs of like power rails include a positive power rail and a negative power rail.

In an embodiment the switching device: includes one or more switches where the or each switch has at least two states; and is responsive to the control signals for selectively changing the state.

In an embodiment the switching device is responsive to the control signals for selectively connecting and disconnecting the power rails.

In an embodiment the switching device is responsive to the control signals for selectively connecting and disconnecting one or more of the power rails from the first input.

In an embodiment the controller includes an input circuit having a third input for connecting to an external energy source and an output for providing the second DC charging current to the second input.

In an embodiment the input circuit includes a filter.

In an embodiment the external energy source is an AC source and the input circuit includes a rectifier.

In an embodiment the input circuit includes an inverter and is responsive to the control signals for drawing a DC current from the second input and supplying via the third input an AC current to the external source.

In an embodiment the first drive circuit selectively provides a current path between at least one of the supply rails in the pair of supply rails and at least one of the one or more windings.

In an embodiment the first drive circuit includes a rectifier circuit.

In an embodiment the rectifier circuit includes at least one half-bridge rectifier In an embodiment the rectifier circuit includes: at least one asymmetrical rectifier.

In an embodiment the second drive circuit selectively provides a current path between at least one of the supply rails in the pair of supply rails and at least one of the one or more windings.

In an embodiment the second drive circuit includes a rectifier circuit.

In an embodiment the rectifier circuit includes at least one half-bridge rectifier.

According to a second aspect of the invention there is provided a controller for an inductive load having one or more inductive windings, the controller including:
  a first input for drawing a DC load current from a first energy source during a first period and for supplying a first DC charging current to the first energy source during a second period;
  a second input for drawing a second DC charging current from a second energy source during the second period; and
  a first drive circuit and a second drive circuit that operate in a first state and a second state during the first period and the second period respectively wherein, in the first state, the drive circuits are connected with the first input for receiving the load current and selectively energising at least one of the one or more windings, and wherein, in the second state, the second drive circuit is disconnected from the first input such that:
    (a) the second drive circuit is able to connect with the second input and be responsive to the second charging current for selectively directing an energizing current through at least one of the one or more windings; and (b) the first drive circuit is able to be responsive to the energising current for generating the first DC charging current.

According to a third aspect of the invention there is provided a controller for an inductive load having one or more inductive windings, the controller including:
  at least two drive circuits, wherein each drive circuit includes a power rail from which DC current is selectively drawn by the drive circuit to energise at least one of the one or more windings; and
  a switching device for operating in a first state and a second state wherein, in the first state, the switching device connects the power rails to a common DC energy source and, in the second state, the switching device isolates at least one of the power rails from at least one other of the power rails and connects the at least one of the power rails to a further DC energy source.

In an embodiment the inductive load is an electric motor and, in the first state, the DC current is a DC load current that is drawn by the power rails to energise the one or more windings to drive the motor.

In an embodiment the electric motor is a DC motor having a single armature winding.

In an embodiment the electric motor has a plurality of windings.

In an embodiment the electric motor has a plurality of interconnected windings.

In an embodiment, in the second state, the DC current drawn by the at least one of the power rails is a DC charging current from the further DC energy source that is at least in part directed through at least one of the one or more windings.

In an embodiment the controller includes a control module for providing control signals, wherein the switching device is responsive to the control signals for operating in the first state or the second state.

In an embodiment the drive circuits are responsive to the control signals for selectively energising at least one of the one or more windings.

In an embodiment each drive circuit includes a set of switches that are responsive to the control signals for selectively energising at least one of the one or more windings.

In an embodiment the sets of switches define respective half-bridge rectifiers.

In an embodiment the inductive load includes three windings and three drive circuits and, in the second state, two of the power rails remain connected.

In an embodiment the controller includes three inductive windings and three drive circuits wherein, in the second state, all of the power rails are isolated from each other.

In an embodiment the controller includes a plurality of windings and a plurality of drive circuits having respective power rails wherein, in the second state, at least one of the power rails for one of the drive circuits is electrically isolated from the other power rails of the other drive circuits.

According to a fourth aspect of the invention there is provided a controller for an electrical machine including a plurality of interconnected inductive windings, the controller including:
  a plurality of drive circuits each having a power rail from which current flows as the interconnected windings are selectively and collectively energised; and
  a switching device for operating in a first state and a second state wherein, in the first state, the switching device connects the power rails to a common DC energy source and/or sink and, in the second state, the switching device isolates at least one of the power rails from at least one other of the power rails and connects the at least one of the power rails to a further energy source and/or sink.

In an embodiment the further energy source and/or sink is one of: a DC energy source and/or sink; and an AC energy source and/or sink.

According to a fifth aspect of the invention there is provided a method for controlling an inductive load having one or more inductive windings, the method including the steps of:

at a first input: drawing a DC load current from a first energy source during a first period;

and supplying a first DC charging current to the first energy source during a second period;

at a second input, drawing a second DC charging current from a second energy source during the second period;

issuing control signals from a control module; and providing a first drive circuit and a second drive circuit that operate in a first state and a second state during the first period and the second period respectively wherein, in the first state, the drive circuits are connected with the first input and are responsive to the control signals for receiving the load current and selectively energising at least one of the one or more windings and wherein, in the second state, the second drive circuit is disconnected from the first input and the first and second drive circuits are responsive to the control signals such that:

(a) the second drive circuit is able to connect with the second input and be responsive to the second charging current for selectively directing an energizing current through at least one of the one or more windings; and (b) the first drive circuit is able to be responsive to the energising current for generating the first DC charging current.

According to a sixth aspect of the invention there is provided a method for controlling an inductive load having one or more inductive windings, the method including the steps of:

at a first input: drawing a DC load current from a first energy source during a first period;

and supplying a first DC charging current to the first energy source during a second period;

at a second input, drawing a second DC charging current from a second energy source during the second period; and providing a first drive circuit and a second drive circuit that operate in a first state and a second state during the first period and the second period respectively wherein, in the first state, the drive circuits are connected with the first input for receiving the load current and selectively energising at least one of the one or more windings, and wherein, in the second state, the second drive circuit is disconnected from the first input such that:

(a) the second drive circuit is able to connect with the second input and be responsive to the second charging current for selectively directing an energizing current through at least one of the one or more windings; and (b) the first drive circuit is able to be responsive to the energising current for generating the first DC charging current.

According to a seventh aspect of the invention there is provided a method for controlling an inductive load having one or more inductive windings, the method including the steps of:

providing at least two drive circuits, wherein each drive circuit includes a power rail from which DC current is selectively drawn by the drive circuit to energise at least one of the one or more windings; and operating a switching device in a first state and a second state wherein, in the first state, the switching device connects the power rails to a common DC energy source and, in the second state, the switching device isolates at least one of the power rails from at least one other of the power rails and connects the at least one of the power rails to a further DC energy source.

According to an eighth aspect of the invention there is provided a method for controlling an inductive load having a plurality of interconnected inductive windings, the method including the steps of:

providing a plurality of drive circuits each having a power rail from which current is drawn to selectively and collectively energise the interconnected windings; and operating a switching device in a first state and a second state wherein, in the first state, the switching device connects the power rails to a common DC energy source and, in the second state, the switching device isolates at least one of the power rails from at least one other of the power rails and connects the at least one of the power rails to a further energy source.

Reference throughout this specification to "one embodiment", "some embodiments" "an embodiment", "an arrangement", "one arrangement" means that a particular feature, structure or characteristic described in connection with the embodiment or arrangement is included in at least one embodiment or arrangement of the present invention. Thus, appearances of the phrases "in one embodiment", "in some embodiments", "in an embodiment", "in one arrangement", or "in and arrangement" in various places throughout this specification are not necessarily all referring to the same embodiment or arrangement, but may. Furthermore, the particular features, structures or characteristics may be combined in any suitable manner, as would be apparent to one of ordinary skill in the art from this disclosure, in one or more embodiments or arrangements.

As used herein, and unless otherwise specified, the use of the ordinal adjectives "first", "second", "third", etc., to describe a common object, merely indicate that different instances of objects in a class of objects are being referred to, and are not intended to imply that the objects so described must be in a given sequence, either temporally, spatially, in ranking, in importance or in any other manner.

Unless defined otherwise, all technical and scientific terms used herein have the same meaning as commonly understood by those of ordinary skill in the art to which the invention belongs. The articles "a" and "an" are used herein to refer to one or to more than one (that is, to at least one) of the grammatical object of the article unless the context requires otherwise. By way of example, "an element" normally refers to one element or more than one element. As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Described herein is a controller for an inductive load having one or more inductive windings.

Figure 1:
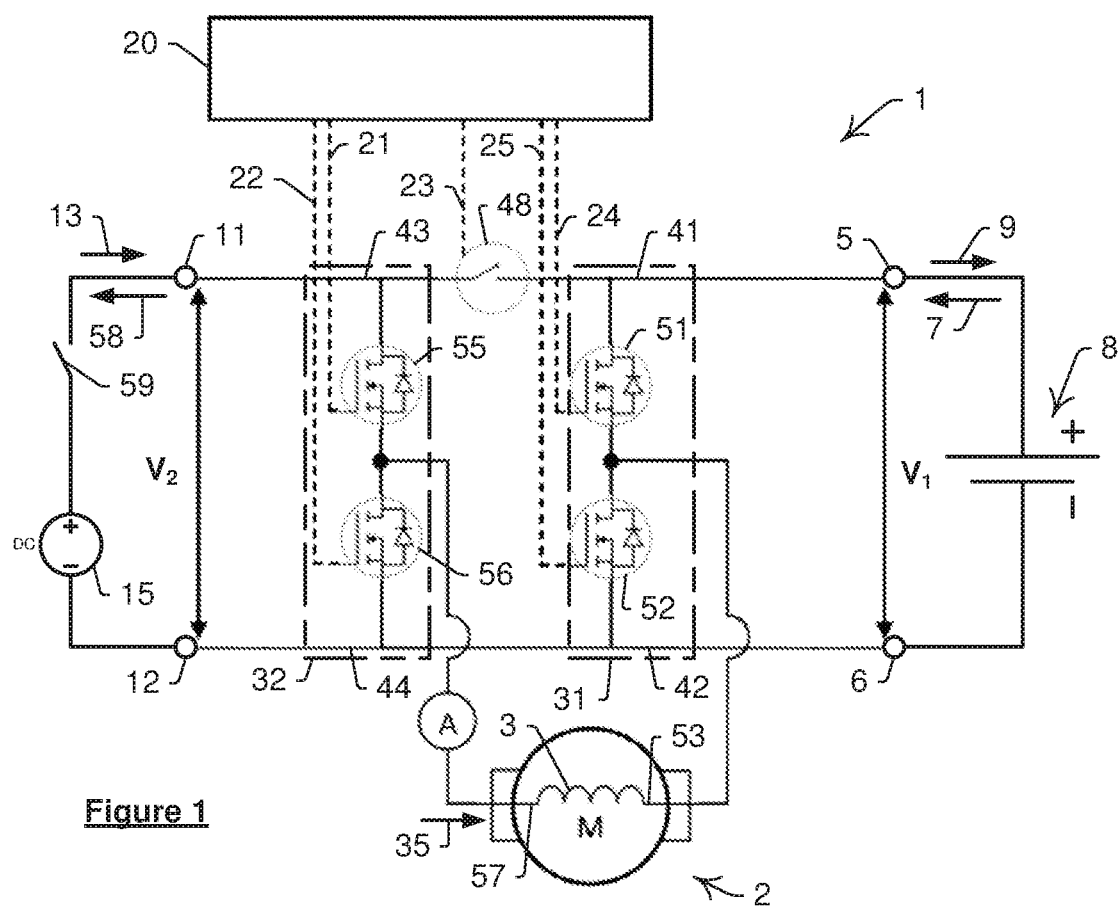
FIG. 1 is an electrical schematic diagram for a controller for a DC motor having a single inductive winding.

Referring to FIG. 1 there is illustrated a controller 1 for an inductive load in the form of a DC electric motor 2 which has an inductive winding 3. Controller 1 includes a first input defined by terminals 5 and 6 for drawing a DC load current 7 in a first period from a first energy source in the form of a bank of batteries 8. Terminals 5 and 6 supply a first DC charging current 9 to batteries 8 during a second period. A second input defined by terminals 11 and 12 draws a second DC charging current 13 during the second period from a second energy source in the form of a DC power source 15. A control module 20 issues control signals along control lines 21 to 25, which are illustrated in FIG. 1 as uniformly broken lines. A first drive circuit 31 and a second drive circuit 32, shown bounded in variable broken lines, both operate in a first state and a second state during the first period and the second period respectively wherein, in the first state, circuits 31 and 32 are connected with terminals 5 and 6 and are responsive to the control signals for receiving load current 7 and selectively energising winding 3 to create torque in motor 2. In the second state, the circuit 32 is disconnected from terminal 5 and circuits 31 and 32 are responsive to the control signals such that: circuit 32 is able to connect with terminal 11 and be responsive to current 13 for selectively directing an energizing current 35 through winding 3; and circuit 31 is able to be responsive to current 35 for generating current 9.

Circuit 31 includes a positive power rail 41 and a negative power rail 42, and circuit 32 includes a positive power rail 43 and a negative power rail 44. Drive circuits 31 and 32 each include a set of switches, which in this embodiment are exemplified by two MOSFETs, each with a freewheeling diode (FWD). In other embodiments, the drive circuits 31 include other configurations of sets of switches, including one or more switches of one or more types. These switches are able to be unidirectional, bidirectional, or multidirectional, and implemented by electrical, mechanical, or electro-mechanical devices including, but not limited to, transistors, MOSFETs, HEMTs, HFETs, MODFETs, IGBTs, Darlington pairs, diodes, photodiodes, thyristors, contactors, relays, or other such existing or future devices. The configuration of the set of switches is able to include, but are not limited to, half-bride, full-bridge, H bridge, asymmetrical bridge, or one or more switches in any configuration of series and/or parallel. Controller 1 includes a bidirectional switching device in the form of a single throw single pole switch 48 for selectively connecting and disconnecting power rails 41 and 43 to and from each other. Switch 48 is implemented in this embodiment with two IGBTs in series having common emitters with freewheeling body diodes. However, in other embodiments another form of uni-directional or multi-directional switch is used such as back-to-back MOSFETs, relays, contactors, mechanical switches, or other such devices including those mentioned in this specification.

In this embodiment the negative power rails 42 and 44 remain connected and are common at all times. However, in other embodiments, another switch, like to switch 48, is located between power rails 42 and 44 for selectively connecting and disconnecting power rails 42 and 44 to and from each other. In other embodiments switch 48 is omitted and only the another switch between power rails 42 and 44 is used. In further embodiments additional switches are used to provide further selective connection and disconnection between rails 41 and 43 and rails 42 and 44. Accordingly, the switching device includes, in different embodiments, at least one switch for selectively connecting and isolating the like power rails. More particularly, the switches each have at least two states and are responsive to the control signals for selectively changing state. The change in state, in response to the control signals, has the effect of selectively connecting and disconnecting the power rails. Moreover, the switching device, in whatever form it takes, is responsive to the control signals for selectively connecting and disconnecting at least one of the power rails from either or both of terminals 5 and 6, and at least one of the other power rails from either or both of terminals 11 and 12.

In the FIG. 1 embodiment, when switch 48 is in the open state (as shown), rail 43 is disconnected or isolated from rail 41 and terminal 5. Although rail 44 is still physically connected to rail 42, drive circuit 32 is functionally disconnected from circuit 31 to allow those circuits to perform different functions. This functional disconnection is able to be established by having the break between either or both of the like power rails in the two drive circuits.

Circuit 31 includes two serially connected MOSFETs 51 and 52 (that define respective switches) that extend between rails 41 and 42 and which receive respective control signals from control module 20 via control lines 24 and 25 to selectively allow a current path to be established between a first end 53 of winding 3 and rails 41 and 42. Similarly, circuit 32 includes two serially connected MOSFETs 55 and 56 (that define respective switches) that extend between rails 43 and 44 and which receive respective control signals from control module 20 via control lines 21 and 22 to selectively allow a current path to be established between a second end 57 of winding 3 and rails 43 and 44. In this way, and subject to the control signal generated by module 20, current is able to be passed through winding 3 in either direction to drive motor 2 or to allow generation of current 9 from current 35.

It will be appreciated by those skilled in the art that drive circuits 31 and 32 include respective half-bridge rectifiers. That is, the MOSFETs 51, 52, 55 and 56 are also operating as switches (albeit with the added function provided by the respective body diodes) in response to the relevant control signals generated by module 20. In other embodiments different set configurations and types of switches are used to substitute for one or more of the MOSFETs. Examples of other such switches include other active or passive electronic components, or combinations of active and passive components. In some embodiments the switches are implemented either in whole or in part with insulated gate bipolar transistors (IGBT), bipolar junction transistors (BJT) or Darlington pairs, or the like. Further embodiments make use of electrical contactors and/or mechanical contactors and/or other such devices.

Module 20 includes a microprocessor and associated hardware such as memory, interface cards, communications ports and the like. The microprocessor is responsive to a wide range of voltage and current inputs and to software code contained within the memory for executing operations that result in control signals being generated and communicated through lines 21 to 25 for controlling the state of switch 48 and MOSFETs 51, 52, 55 and 56 to allow the above functions, and others, to be realised. In this embodiments module 20 is dedicated to the operation of controller 1. However, in other embodiments, motor 2 is for providing locomotive power to an electric vehicle and module 20 is a control system for the electric vehicle and controls functions in addition to those directly relevant to controller 1. In further embodiments motor 2 is a single phase AC motor for driving the compressor of an air conditioning unit and module 20 is a control system from a building power management system and controls functions in addition to those directly relevant to controller 1.

In further embodiments motor 2 is part of a water bore pump (not shown) and module 20 is a control system to control the power management between an array of solar PV panels, an attached battery, and motor 2. In further embodiments, the inductive load is one or more heating elements, and module 20 is responsive to various inputs for providing a financially effective heating operation. This includes the selective draw of current from the electrical grid and one or more attached energy storage devices for maintaining heating requirements and/or charging the one or more other attached energy storage devices. In still further embodiments, motor 2 is part of a cordless appliance such as a cordless vacuum cleaner or power tool, and module 20 is the control system responsible for the operation of the appliance or tool during the intended use of the appliance or tool, and for the charging cycle of the appliance or tool whilst not in use and connected to a suitable power source at the second input.

The various embodiments of the invention make use of the switching device to interrupt the power rails between at least two drive circuits that collectively provide drive current to the motor during normal drive conditions. These normal drive conditions equate to the period in which module 20 is operating controller 1 in the first state.

The switching device in its simplest form is a single switch, such as switch 48 in FIG. 1, which selectively connects and separates at least one of the drive circuits from at least one other of the drive circuits. This allows the separated or isolated drive circuit to be connected to, and to draw a DC current such as current 13, from a different source than the other drive circuits. Through module 20 controlling the operation of the two circuits to act as a charger in this separated configuration (that is, the second state), the DC current is allowed to flow through the winding of the motor—or for multi-winding motors, through one or more of the windings—and to make use of that winding as part of the Buck-boost structure of the charger. That is, the separation of the control circuits and the controlled cooperation between the separated drive circuits allows those circuits to define, in combination with winding 3, a non-inverting cascaded buck-boost converter for charging, for example, batteries 8 from another DC source, such as source 15.

Although the above operation of module 20 is described with reference to charging batteries 8 when operating in the second state, in other embodiments there are additional or alternative options available during the second state as will be described in the embodiments below. All these options arise from module 20 providing controller 1 with the capability of translating energy between at least two DC voltages.

It will also be appreciated that module 20 is able to control switch 48 and MOSFETs 51, 52, 55 and 56 to implement additional functionalities. Particularly, module 20 is able to issue control signals that enable controller 1 to provide bi-directional current between batteries 8 and source 15. That is, controller 1 is able to charge source 15 by drawing energy from batteries 8.

Moreover, in circumstances where motor 2 is being driven as a generator, module 20 is able to issue control signals such that the current generated by motor 2 is used to define DC current 9. Alternatively, the current generated is able to define a DC charging current 58 that flows from terminal 11, in the opposite sense to current 13, into source 15 (where source 15 is a rechargeable source able to receive that current). These circumstances exemplarily include in an electric vehicle application where use is made of regenerative braking. In other embodiments, module 20 provides control signals to alternately or simultaneously generate currents 9 and 58.

As controller 1 makes use of circuits 31 and 32 and winding 3 to define a Buck-boost converter structure module 20 is able to provide DC charging across differing voltage levels and, for multiphase applications, across multiple voltage levels, which will be described in more detail below.

Accordingly, in general terms, embodiments of the invention are available with one or up to all of the following capabilities:

To drive a motor from a first power source during the first state.

To drive the motor from a second power source during the first state.

To drive the motor from either or both of the first power source and the second power source during the first state.

To charge either or both of the first power source and the second power source from current generated by the motor, where those power sources are rechargeable power sources.

To charge the second power source from the first power source during the second state, where the second power source is a rechargeable power source.

To charge the first power source from the second power source during the second state, where the first power source is a rechargeable power source.

That is, for those embodiments making use of two rechargeable energy sources and a motor, and offering all of the above capabilities, the controller for the motor provides full bidirectional energy flows between the motor and the energy sources.

Moreover, where a multiphase motor is appropriately configured any number of the motor phase windings, including up to all of the motor windings, are able to be used for the voltage translation power conversion. Furthermore, the windings are able to be configured in series or parallel (or a combination of series and parallel) to offer respectively greater inductance to the buck-boost structure and higher rates of power transfer.

In those embodiments where the inductive load is a motor, such as provided in FIG. 1, it is typically beneficial to disable the motor while using the motor as the buck, boost, or buck-boost inductor during the voltage translating operation. This prevents creating excessive torque in the motor during that operation. In a DC motor this includes, for example, disconnecting or bypassing the field winding and using the armature winding as the load inductance. In other embodiments a similar effect is achieved by disconnecting or bypassing the armature winding and using the field winding as the load inductance. In an AC motor this effect includes, for example, controlling the current waveform so that it does not induce torque in the motor. In some embodiments the stator and the rotor of the motor are preferentially mechanically locked during the power conversion operation.

In some embodiments motor 2 is a pump motor that operates intermittently or infrequently and source 15 is a PV array. (A specific example of this is provided below with reference to FIG. 2). When the PV array is generating power (that is, when sufficient sunlight falls upon the array) and motor 2 is required to operate, module 20 provides control signals such that the power generated by the PV array is used to directly drive the motor, with batteries 8 only having to provide any shortfall based upon the current being drawn by motor 2. If motor 2 is not required to operate when power is supplied by the PV array, module 20 provides control signals to direct any DC current from the array, which is boosted or reduced in voltage (via the cooperation between winding 3 and circuits 31 and 32), to define current 9, at the required DC voltage, to increase the state of charge of batteries 8. During this charging of batteries 8 using controller 1, module 20 is able to regulate the charge current 9 and enable Maximum Power Point Tracking (MPPT).

As the PV array is not a rechargeable source it will typically have either a protection diode or a switch, such as switch 59 (not shown) that is controlled by module 20, to prevent a flow of current into the PV array.

The above operation is also enabled in embodiments making use of multiphase motors. For example, in FIG. 2, where corresponding features are denoted by corresponding reference numerals, there is illustrated a controller 61 for an inductive load in the form of a three phase motor 62 having three windings 3a, 3b and 3c in a wye configuration. In light of the need to drive three inputs for motor 62, controller 61 includes three drive circuits, including circuit 31, circuit 32 and circuit 63. It should also be noted that motor 62 is a three phase pump motor, and source 15 is a PV array that provides current 13. In other embodiments motor 62 is used in other than a pump, and source 15 is other than directly from a PV array.

Figure 2:
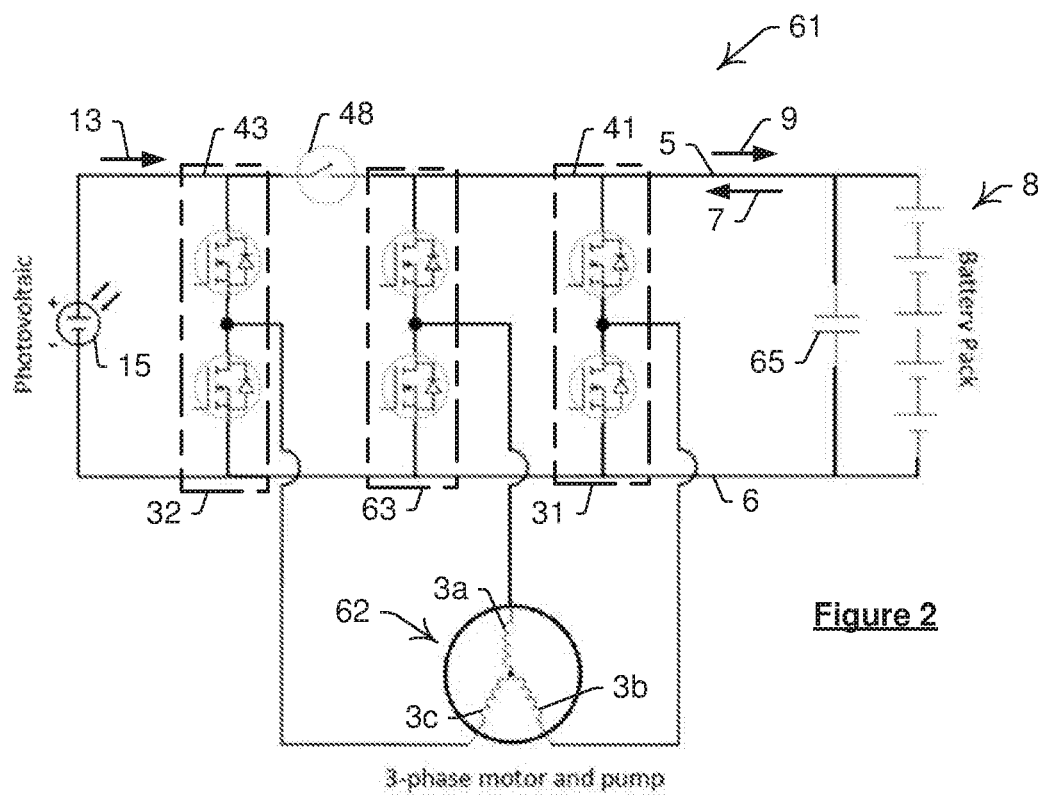
FIG. 2 is an electrical schematic diagram of a controller for a three phase inductance motor having a wye configuration and which is configured to receive DC power from an external PV array.

It will also be noted that some features have been omitted from FIG. 2 (and others of the figures) for simplicity and clarity. For example, in FIG. 2 switch 59 has not been explicitly shown. It will be appreciated however by the skilled addressee that such a switch, and other such components such as current limiting circuitry, other protection circuitry, earthing circuitry and the like, are included depending upon the application and design parameters of the motor, the controller, and the associated circuits.

In this embodiment, a further rechargeable energy storage device, in the form of a capacitor 65, is placed in parallel with batteries 8 to accommodate high power flows both in currents 7 and 9. In other embodiments the rechargeable energy storage device is a plurality of capacitors, one or more ultra-capacitors, one or more hybrid capacitors/ultra-capacitors, or a combination of one or more of these or other such devices.

Switch 48 operates, in response to relevant control signals from module 20 (not shown in this Figure) to selectively disconnect rails 41 and 43. In addition, module 20 generates further control signals for circuits 31, 32 and 63, to allow for the required energy flows during the different states of operation.

While in the FIG. 2 embodiment the power rails for circuits 31 and 63 remain always connected that should not imply that, when switch 48 is open, that both circuits 31 and 63 must operate in the same manner, although in some embodiments that identical operation does occur. For example, there are circumstances where motor 62 is not required to operate and current 13 from source 15 is available to charge batteries 8, but it is quite small. In such cases, and when controller 1 is operating in a boost mode, either of circuits 31 and 63 are able to be rendered inoperative—in that both MOSFETs in that drive circuit are turned OFF—and the charging function, on the downstream side of the windings, is performed by the controlled switching (by module 20) of the other of circuits 31 and 63. In other embodiments, and under light load conditions, circuits 31 and 63 are controlled in a phase shifted manner, simultaneously, or inversely. In further embodiments, the structure of the controller is changed to change the inductance/power capability/efficiency, and examples of this are described below.

In other embodiments switch 48 is disposed between circuits 31 and 63. In still further embodiments, an additional like switch is disposed between circuits 31 and 63 that is responsive to control signals from module 20 to operate in unison with or separately from switch 48 depending upon the functionality being provided by controller 61 at the relevant time, or the parameters for which the operation of controller 61 is being optimised.

It will also be appreciated that although switch 48 is disposed in FIG. 2 to provide a break between the positive power rails of adjacent drive circuits, in other embodiments the or a further switch is disposed to provide instead, or in addition, a break between the negative power rails of adjacent drive circuits.

Controller 61 is also able to applied, for example, to an electric vehicle. That is, motor 62 is used to provide locomotive energy to the vehicle and batteries 8 are on-board batteries for the vehicle. In such an embodiment capacitor 65 is substituted by an energy storage device such as a bank of ultra-capacitors working in cooperation with batteries 8. In other embodiments alternative substitutions are used. Module 20 controls the operation of circuits 31, 32 and 63 to provide the required voltage translation and/or current shaping/control requirements, including bidirectional power requirements for the energy accumulator to charge and discharge while maintaining the ability to operate motor 62 to provide the required locomotive force which varies considerably over time. This functionality includes, for example, operating in the first state by having switch 48 in its closed state and operating circuits 31, 32 and 63 to connect motor 62 to batteries 8 and the bank of ultra-capacitors to allow the considerable current 7 to be drawn. Between periods in which motor 62 is being actively driven to provide locomotive drive to the vehicle, module 20 is able to operate in the second state by having switch 48 in its open state and operating circuit 32 and one or both of circuits 31 and 63 to allow recharging of batteries 8 (and energy store 65) from an external power source such as source 15. In some cases it is beneficial to transfer power back into the external source, for example, for vehicle-to-everything (V2X) operation. Controller 61, when used in an electric vehicle, accommodates these multiple modes of charge and discharge making use of substantially only the existing drive circuits in the vehicle, albeit configured in a new way. For example, in V2X operation, AC output is required to put energy back on to the electrical power grid (V2G), whereas DC output may be beneficial to directly charge another electric vehicle (V2V) which may have run out of battery energy. Where AC output is required, controller 61 includes additional circuitry, which will be described in more detail below.

Controller 61 is well suited for use in an electric vehicle as it is able to utilise the high power rating of the existing drive components to enable fast charging of the on-board storage (batteries 8) from a high powered DC supply while using minimal extra components. With the inclusion of an input circuit with a rectifier and/or inverter, controller 61 is also able to accept high power AC charge currents—for example from a standard three phase grid connection—and to return AC to the external source. In either case, controller 61 makes redundant the dedicated on-board charger required on prior electric vehicles.

It is noted that for electric vehicle applications of controller 61, the chassis of the vehicle should be earthed during any external connection that has a voltage potential to earth, and the on-board energy storage and the chassis of the vehicle should be electrically isolated from each other. The usual care should be taken to ensure there is minimal earth leakage current and/or capacitance build up between any on-board energy storage and the chassis of the vehicle. It will be appreciated by those skilled in the art, having the benefit of the teaching herein, that in all embodiments use should be made of suitable earth connections that comply with the relevant standards in the jurisdiction in which the embodiment is implemented.

Figure 3:
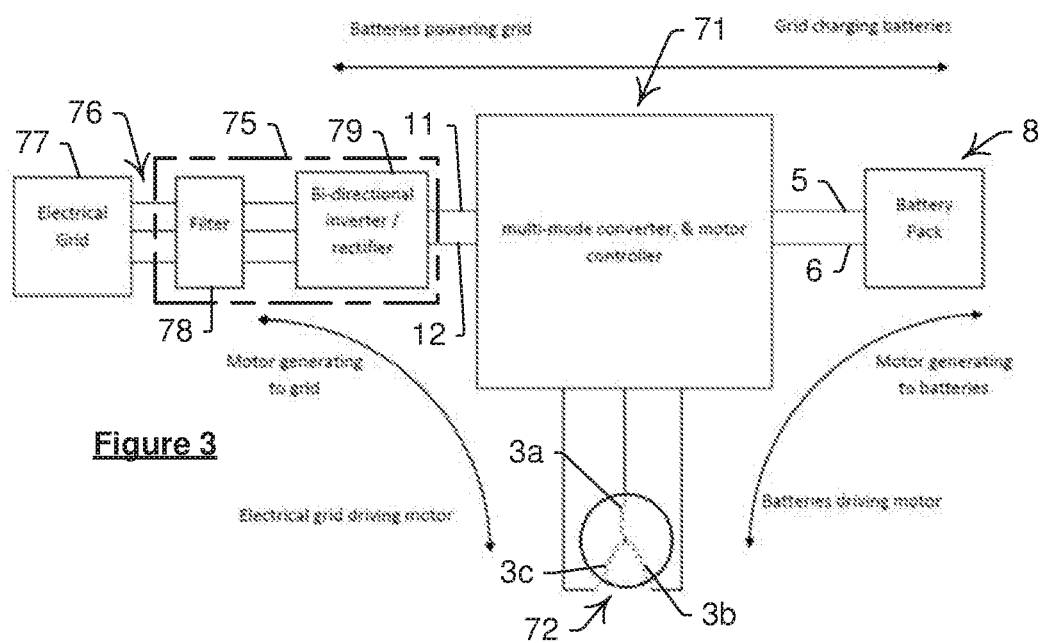
FIG. 3 is a schematic view of a controller similar to FIG. 2 for use in an electric vehicle and which is configured to receive three phase power from an external electricity grid.

Referring to FIG. 3 there is schematically illustrated an embodiment of the invention for an electric vehicle (not shown) where corresponding features are denoted by corresponding reference numerals. In this embodiment a controller 71 for an inductive load in the form of a three phase motor 72 having three windings 3a, 3b and 3c in a wye configuration. Controller 71 includes an input circuit 75 having input terminals 76 for connecting with a three phase grid 77. Circuit 75 includes a filter 78 and a bidirectional inverter and rectifier circuit 79. This allows controller 71 to effect bidirectional power flows to and from grid 77 in addition to the other power flows mentioned above. It will be appreciated that when power is drawn from and provided to grid 77 and respectively into and from controller 71, that the voltage at terminals 11 and 12 is always a DC voltage.

The six energy/power flows—that is, the three bidirectional flows—enabled by controller 71 are illustrated in FIG. 3. That is, controller 71 provides a fully bidirectional DC-DC converter disposed electrically between the two sources of energy (the on-board batteries, and the external source), and a DC-DC, DC-AC or AC-DC converter between either of the sources and the motor.

Figure 4:
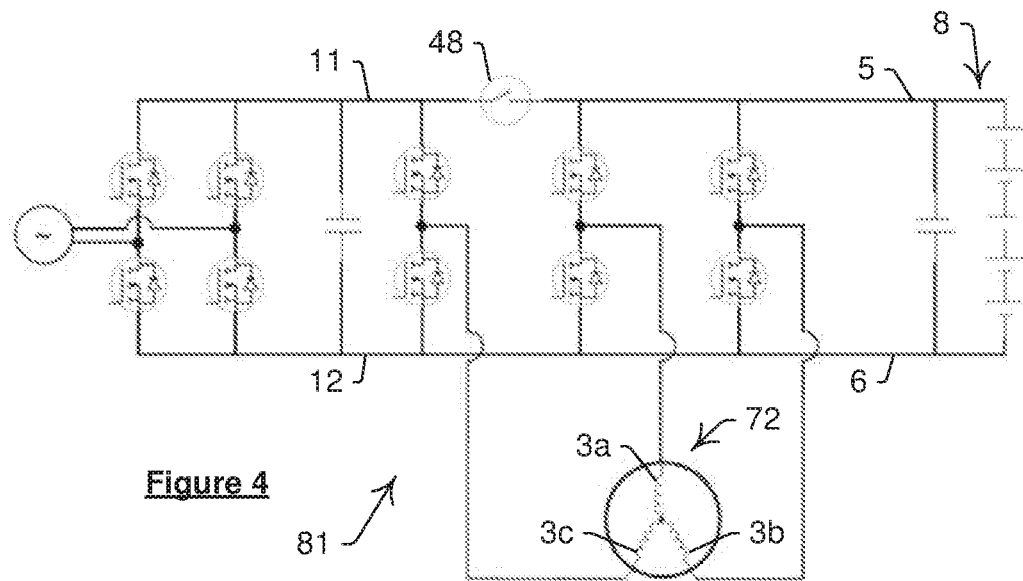
FIG. 4 is an electrical schematic diagram of a controller similar to the controller of FIG. 3 which is configured to receive single phase power from the external electricity grid.
Figure 5:
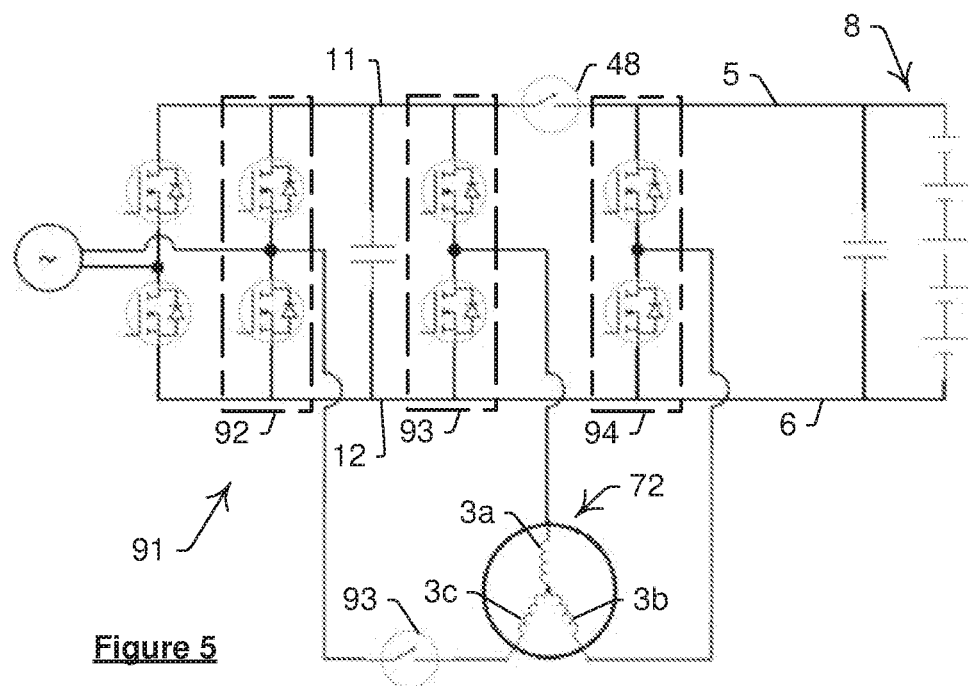
FIG. 5 is an electrical schematic diagram of a controller similar to that of FIG. 4 illustrating an alternative configuration to receive single phase power from the electricity grid.

While controller 71 makes use of a three phase grid connection, it will be appreciated that a single phase connection or a DC connection to grid 77 is also able to be used. Two examples of the latter are illustrated in FIG. 4 and FIG. 5 as controllers 81 and 91 respectively. In the FIG. 5 embodiment, a drive circuit 92 is utilised to rectify the incoming AC current. However, during this rectification operation, circuit 92 is isolated from the windings of the motor by module 20 (not shown) having a switch 93 held in its open state as illustrated in FIG. 5. The DC current that is generated by this rectification is provided to a drive circuit 93, which is separated from the remaining drive circuit 94 by module 20 holding switch 48 in its open state, as also illustrated in FIG. 5. This allows for two of the windings (or more than two if there are more than three windings) to be used to provide the buck-boost function. The windings do not contribute to the rectification of the AC current.

In some embodiments the controller is able to receive either single phase or three phase power from grid 77. However, in other embodiments only single phase power or three phase power is able to be obtained from or supplied to grid 77. In still further embodiments DC power is able to be obtained from and supplied to grid 77.

Figure 6:
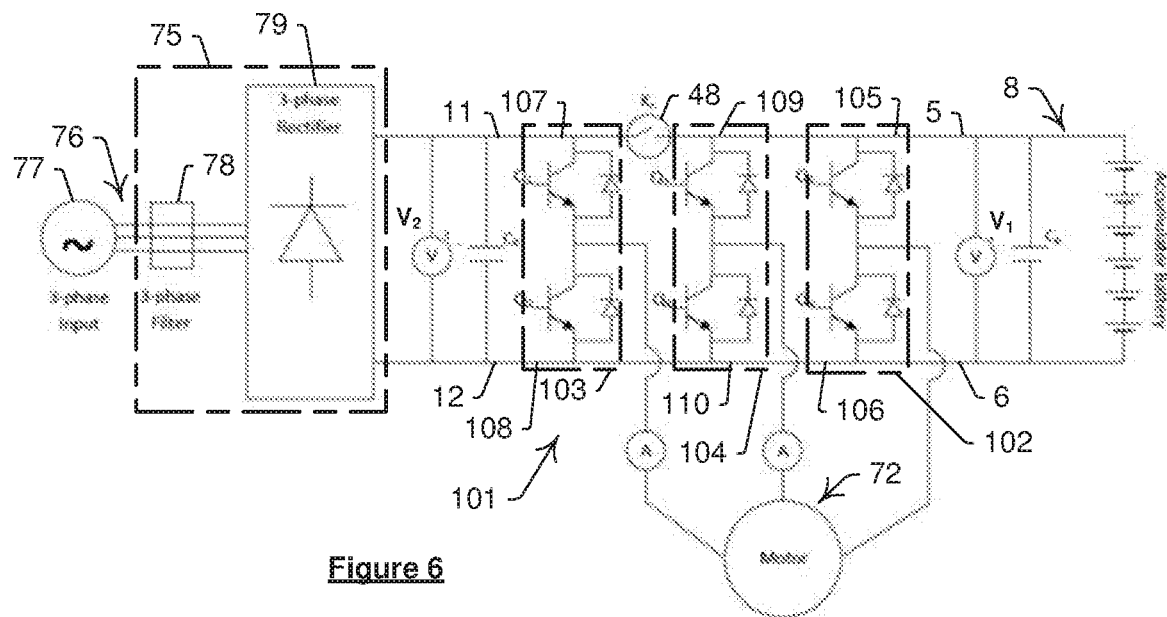
FIG. 6 is an electrical schematic diagram of a controller for use in an electric vehicle and which is configured to receive three phase power from an external electricity grid and which has three drive circuits including insulated gate bipolar transistors.

A further embodiment of the invention is illustrated in FIG. 6, where corresponding features are denoted by corresponding reference numerals. More particularly, a controller 101 for an inductive load in the form of motor 72 has three drive circuits 102, 103 and 104 that have positive and negative power rails 105 and 106, 107 and 108, and 109 and 110 respectively. Circuits 102, 103 and 104 include respective pairs of switches that receive control signals from module 20 (not shown) to determine the state of the switches at any given time. In this embodiment, each switch is implemented with an IGBT, and the control signals are received at the gate of the transistors. The phases of the three-phase motor are able to be connected in either a delta or a wye configuration.

When controller 101 is operating in the first state to drive motor 72, module 20 provides a control signals to switch 48 such that it is maintained in its closed state. Accordingly, all of positive power rails 105, 107 and 109 are common, all of the negative power rails 106, 108 and 110 are common, and the state of the switches in circuits 102, 103 and 104 are sequentially changed to provide the required timing and level of current to operate the three coils of motor 72 such that the locomotive energy for the electric vehicle (not shown) is generated. When the electric vehicle is not requiring drive to be provided to motor 72 it is possible to connect controller 101 to grid 77, via circuit 75, and the controller is able to operate in the second state by having switch 48 maintained in its open state, as illustrated in FIG. 6. The result is that rails 105 and 109 remain common, while rail 107 is disconnected from those other rails. This allows circuit 103 to provide, together with circuits 102 and/or 104 and one or more of the windings in motor 72, the required buck-boost function. At least one of circuits 102 and 104 will operate to provide a current path from motor 72 to terminal 5 or 6 to allow the charging current to flow into batteries 8 (and any associated accumulator). If the connection to grid 77 has sufficient capacity, it is possible for both of circuits 102 and 104 to simultaneously provide a current path from motor 72 to terminal 5 or 6 so as to increase or optimise the charge current entering batteries 8.

It will be noted from FIG. 6 that, for electric vehicle applications, it is common to have a decoupling capacitance across the power rails. A capacitor is shown in this embodiment across terminals 5 and 6 (shown as $C_b$) and across terminals 11 and 12 (shown as $C_r$). A further advantage of the architecture of the embodiments of the invention, when used in electric vehicles and other applications having such capacitances, is that the Buck-boost functionality provided is available to pre-charge (or discharge) $C_r$ and/or $C_b$ from batteries 8 and/or from grid 77 (or any other power source being used). This Buck-boost function, controlled by module 20, accommodates any voltage differences between the different parts of the circuit without requiring the use of additional protection circuitry such as current limiting circuitry to avoid damage from inrush currents should one or both of capacitors $C_r$ and $C_b$ be at a low level of charge. In this embodiment, $C_r$ is used as the main bulk capacitance for the drive circuits and is pre-charged through the buck-boost functionality mentioned above. In other embodiments, multiple capacitors and/or snubbers and/or other devices such as a bank of ultra-capacitors, make up the bulk capacitance and may be distributed throughout the system. In a fault condition, the control module may make use of the buck-boost capabilities as to quickly discharge the bulk capacitance to comply with any standards and/or regulations applicable to the intended application.

Figure 7:
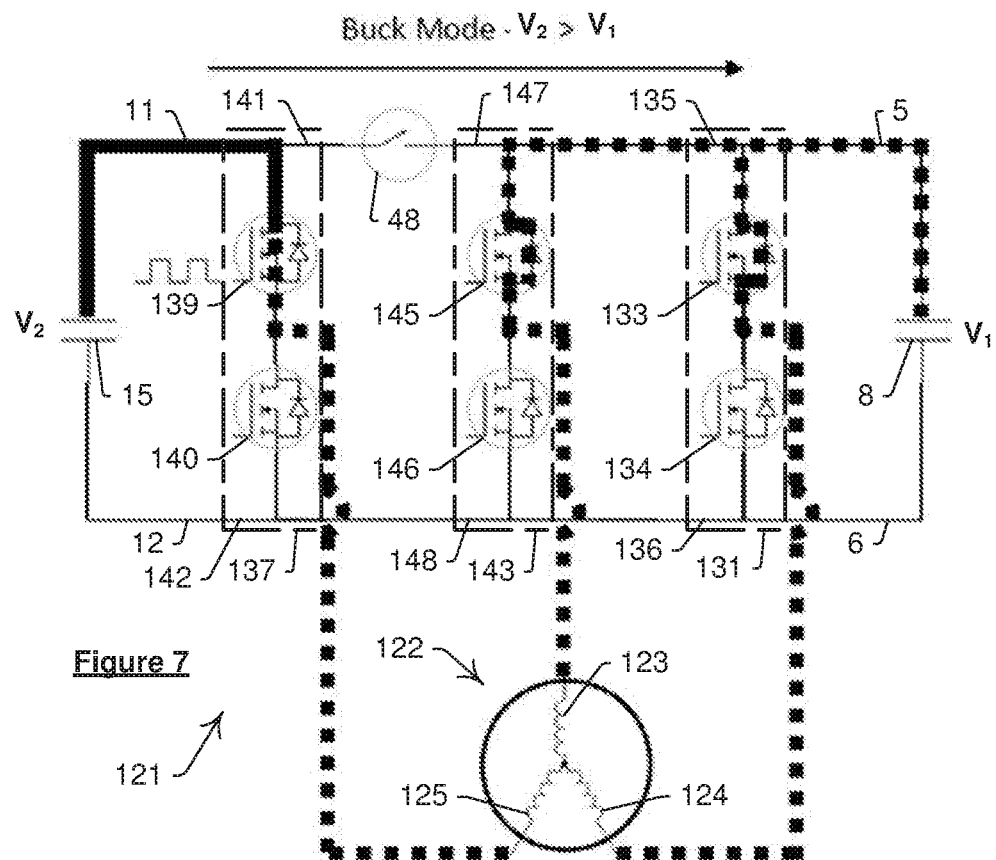
FIG. 7 is an electrical schematic diagram of another controller for use in an electric vehicle when operating in the second state and in a buck mode.

Reference is now made to FIG. 7 where there is illustrated a further controller 121 for an inductive load in the form of a three phase motor 122 with three windings 123, 124 and 125 in a wye configuration. The DC source at terminals 5 and 6 is batteries 8, which have a voltage $V_1$, and the DC source at terminals 11 and 12 is rechargeable source 15 which has a voltage $V_2$. It will be appreciated from the teaching herein that the two DC sources are able to be selected from a wide variety of sources. It will also be appreciated that controller 121 includes an input circuit 75 (not shown) for allowing electrical energy to be transferred to and from grid 77 via terminals 11 and 12.

Figure 8:
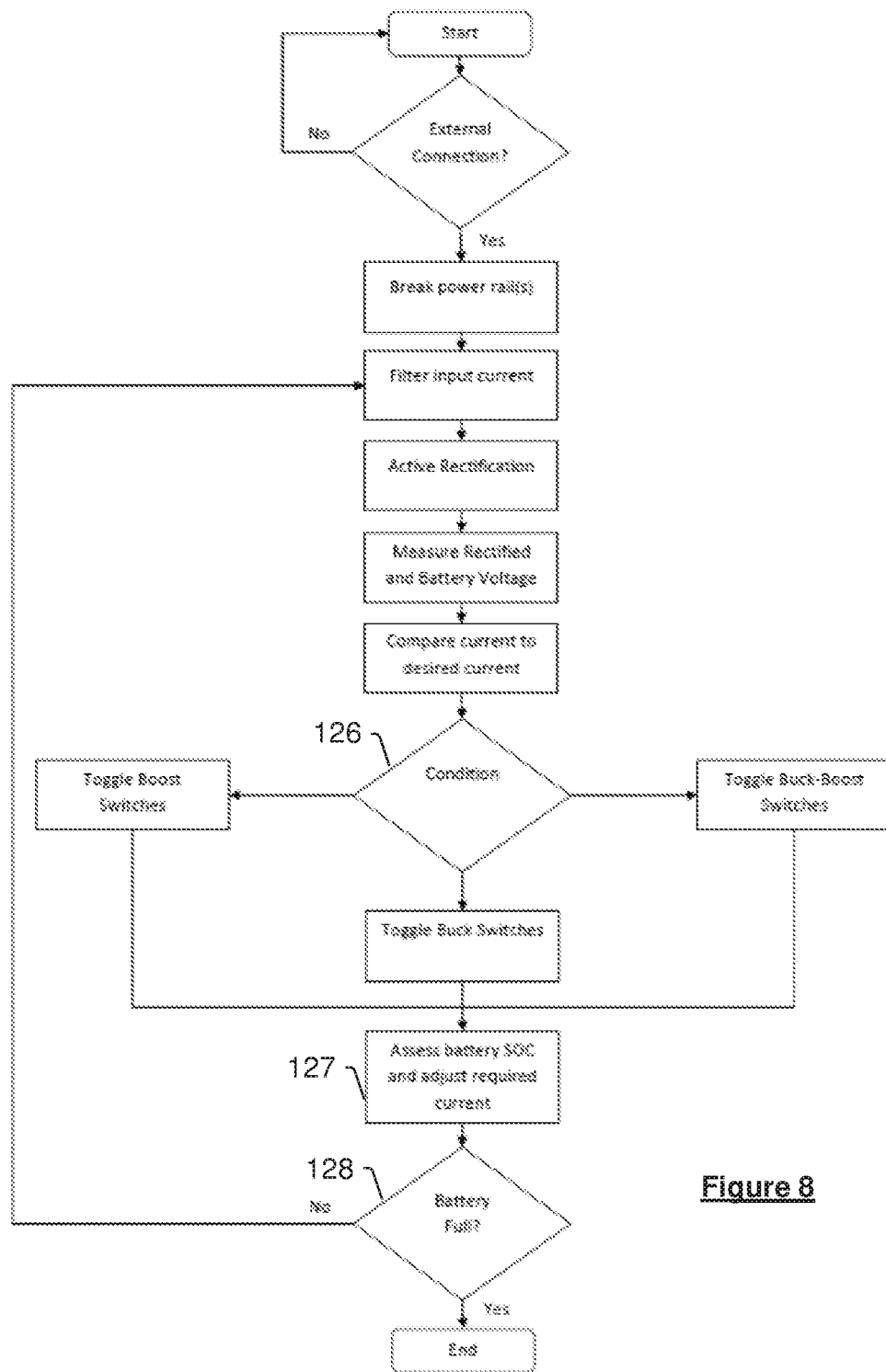
FIG. 8 is a flow chart of the steps followed by the controller of FIG. 7 when operating the second state.

In this example, controller 121 is an on-board controller for an electric vehicle (not shown) and module 20 (also not shown) functions so as to deliver the required operation of controller 121. When operating in the second state, controller 121 is responsive to a number of inputs (which are used by module 20 to generate the control signals) to perform the steps set out in FIG. 8. These steps are followed by module 20 executing software stored in local memory, and includes gaining information about the present operating parameters of controller 121 (including present voltages, such as $V_1$ and $V_2$, and others such as currents 7, 9, 13, 35 and 58). In embodiments that include more than one inductive winding, more current sensors are typically used to allow more accurate control of the system. Similarly, in embodiments that include more than one power rail break, more voltage sensors are typically used. The control strategy of FIG. 8 is simplified to concisely demonstrate one control method possible of operation in the second state, but other control methods are possible. The control method is also responsible for operations not shown, such as safety checks and measures, which are able to include multiple levels of redundancy. These redundancy measures, in some embodiments, take the form of hardware or software redundancy including feedback loops and/or human input, to compliment the control operation. For instance, this feedback is able to include redundant feedback from both a charging plug and a human actuated mechanical input switch before the control method enters the second state of operation shown in FIG. 8. The control method is also able to include other features as to comply with applicable standards and/or regulations of the application, such as those used in automotive applications. In some embodiments, the control is also sensitive to other feedback, for example, such as that gained through communication with the electrical grid or interface plug to ascertain the maximum permissible power level able to be drawn or returned. It will be appreciated by those skilled in the art that the control strategy shown is able to be expanded or contracted based on the requirements of the application.

With the electric vehicle not requiring motor 122 to provide locomotive drive, module 20 has switch 48 in its open state. If a DC input voltage exists (for example, where source 15 is a rectified AC voltage from input circuit 75 or if the output of a PV array is connected) this will be present across terminals 11 and 12.

While in this embodiment terminals 76 of circuit 75 (not shown) receive an AC voltage from a grid 77, in other embodiments terminals 76 are connected to a DC source such as a dedicated DC charging station for the electric vehicle. In other embodiments, terminals 76 are connected to an unregulated DC supply such as a grid tied bidirectional battery storage unit. In other embodiments, input circuit 75 is designed to accept the voltage requirements of, and interface with, a high voltage DC (HVDC) electrical power transmission line or derivation thereof. Accordingly, in this embodiment, input circuit 75 is configured to be responsive to either polarity of DC voltage at terminals 76 to provide a consistent polarity of DC voltage across terminals 11 and 12. When generating current 58, module 20 is responsive to the polarity of the DC voltage at terminals 76 for determining the control signals required to be supplied to input circuit 75.

At step 126 module 20 is responsive to the relevant inputs (most significantly, the voltage across batteries 8—which in FIG. 7 is $V_1$—and the voltage across terminals 11 and 12—which in FIG. 7 is $V_2$) to ascertain the nature of the conditioning that is required to provide the required charge to batteries 8. This includes operating the drive circuits to deliver a boost mode, a buck mode, or a buck-boost mode, which will be described in more detail below. Once the required mode has been determined by module 20, it then issues control signals to implement the selected mode at step 127 while also adjusting the charging current supplied. This operation is maintained until module 20 assesses at step 128 that batteries 8 are charged.

Reference is again made to FIG. 7 in which controller 121 is illustrated as operating in the buck mode in the second state when the first energy source is being charged from the second energy source. That is, module 20 detects that $V_1 < V_2$ and issues control signals to establish current paths from terminals 11 and 12 to terminals 5 and 6 to provide the required charging current. These current flows are represented in FIG. 7 as thick lines superimposed upon the schematic diagram, where the solid lines indicate continuous (although changing) DC voltage levels in the current path, and the broken lines indicate switched DC voltage levels in the current path. Controller 121 includes a first drive circuit 131, having two MOSFETs 133 and 134 connected to positive power rail 135 and negative power rail 136 respectively, a second drive circuit 137, having two MOSFETs 139 and 140 connected to positive power rail 141 and negative power rail 142 respectively, and a third drive circuit 143, having two MOSFETs 145 and 146 connected to positive power rail 147 and negative power rail 148 respectively.

When operating in buck mode in the second state, module 20 provides a control signal to switch 48 to remain in its open position, and then provides control signals to the gates of all of MOSFETs 133, 134, 139, 140, 145 and 146. The control signals provided to the MOSFETs are selected to ensure those individual MOSFETs operate specifically and overall collectively to deliver the required buck functionality. For example, the control signals provided to MOSFETs 134 and 146 are to maintain a non-conductive state and thereby prevent a current path from being established through those MOSFETs to respective rails 136 and 148. The control signals provided to MOSFETs 133 and 145 is also to maintain those switches in their open state (that is, the MOSFETs themselves are not conductive). However, as those MOSFETs include a body diode, a current path is established to respective supply rails 135 and 147. The control signal provided to MOSFET 139 is a pulse width modulation (PWM) signal. That is, although the current path through MOSFET 139 will be segmented (due to the PWM control signal) the current flow in the indicated current path downstream of MOSFET 139 will be continuous (although variable) when operating in a continuous conduction mode (CCM) due to the current path including the three windings of motor 122. The control signal provided to MOSFET 140 maintains that switch in its open state. Accordingly, there is no conduction through that MOSFET proper. However, when MOSFET 139 is switched OFF an into its open state, current will be drawn through the body diode of MOSFET 140 due to the inductive effect of the windings in the indicated current path. This provides for asynchronous operation of MOSFETs 139 and 140. In other embodiments MOSFET 140 is provided with PWM control signals that are the inverse of those provided to MOSFET 139 to enable synchronous operation of those MOSFETs. Alternatively, in some embodiments MOSFETs 133 and 145 are used to provide synchronous operation and reduce the forward conduction losses of their respective diodes.

In other embodiments module 20 provides control signals such that controller 1 works in modes other than CCM. Examples of other such modes include discontinuous conduction mode (DCM), or other hybrid modes such as pseudo continuous conduction mode (PCCM). In some embodiments, individual inductive windings are in different conduction modes than the other windings.

In further embodiments a further switch, like to switch 48, is disposed between rails 135 and 147 for allowing those rails to be selectively connected and disconnected in response to control signals from module 20. This allows for the implementation of a multiphase buck converted, with PWM control signals being provided to one or both of the gates of MOSFETs 139 and 145.

In the example provided in FIG. 7, the buck inductance is 1.5 times the individual phase inductance of the individual windings of motor 122, whereas the boost inductance is 1.5 to 2 times the individual phase inductance. If the wye configuration of windings in FIG. 7 is substituted with a delta configuration, the buck inductance is equivalent to half the individual winding inductance, and the boost inductance is between 0.66 to 1 times the individual phase inductance. Therefore it is possible to get a configuration for buck and boost inductance values that are between half and two times the individual phase inductance.

In other embodiments using a wye configuration and where switch 48 is located between rails 135 and 147, the buck and boost inductances are 1.5 to 2 times the individual phase inductance. For the same alternate location of switch 48 and using the delta configuration, the buck and boost inductances are 0.5 to 0.66 times the individual phase inductance.

The different buck, boost or buck-boost inductances, along with the switching frequency of the drive circuits controlled via module 20 (not shown), are able to be optimised based on the power loading requirement at any given time. The system architecture is able to be optimised based on the intended voltage of the attached energy storage device, the power of the required DC-DC conversion, and the voltage of the power source at the second input. In the application to an electric vehicle being charged from the electrical grid, the system architecture is optimised based on the on-board battery voltage, charging power capability, and the local grid voltage where the vehicle is to be deployed. This system architecture optimisation is achieved through component selection, placement selection of the switch 48, the number of power rail interruption switches, star or delta winding configuration of the motor, and the switching control method and frequency employed by module 20. Component selection is in some embodiments influenced by voltage and/or current carrying capability, rise/fall time, switching frequency, conduction resistance, power consumption, quality, cost, or a range of other measures depending on the component in question. Optimisation is also able to be implemented in the control strategy such that component stress is managed and/or evenly distributed such that the life expectancy of critical components is prolonged. Similarly, the system is able to be optimised based on failure modes and effects analysis (FMEA) such that operational safety is improved and complies with all applicable standards and/or regulations of the intended application. For example, in some embodiments it is desirable to implement a specific type of switch 48 which has a short circuit failure mode so that the motor operation will not be interrupted in a fault condition whilst operating in the first state.

In other embodiments use is made of multiple interruptions—that is, disconnections—on the positive power rail to enable selection at any given time of one of a plurality of buck or boost inductances to enable variable inductance to improve the efficiency of the controller at different voltages, loading levels, and charging current flow directions.

In other embodiments, use is made of switching mechanisms such that the attached motor or polyphase load is able to change on demand between a wye, delta and/or other configurations.

Figure 9:
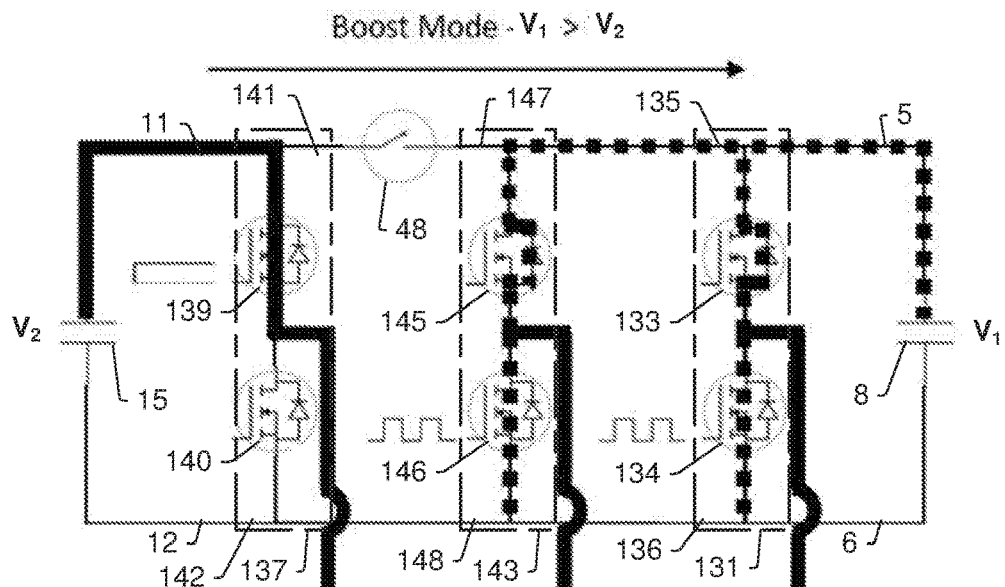
FIG. 9 is an electrical schematic diagram of the controller of FIG. 7 operating in the second state and in a boost mode.
Figure 9:
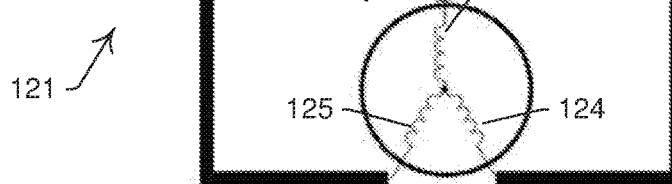

Reference is now made to FIG. 9 where controller 121 is illustrated as operating in the boost mode, in that $V_1 > V_2$ in the second state when the first energy source is being charged from the second energy source. In this embodiment the boost mode is achieved by module 20 maintaining MOSFET 139 in the closed or conductive state, and applying a PWM control signal to the gates of MOSFETs 134 and 146. To obtain a variable inductance in the indicated current path, MOSFETs 134 and 146 are operated together or singularly. Preferentially, to reduce harmonics and have a more regular current draw, MOSFETs 134 and 146 are operated in phase shifted operation or inversely. The inductance provided by the windings of motor 122 will push current through the body diodes of MOSFETs 133 and 145 to charge batteries 8.

Figure 10:
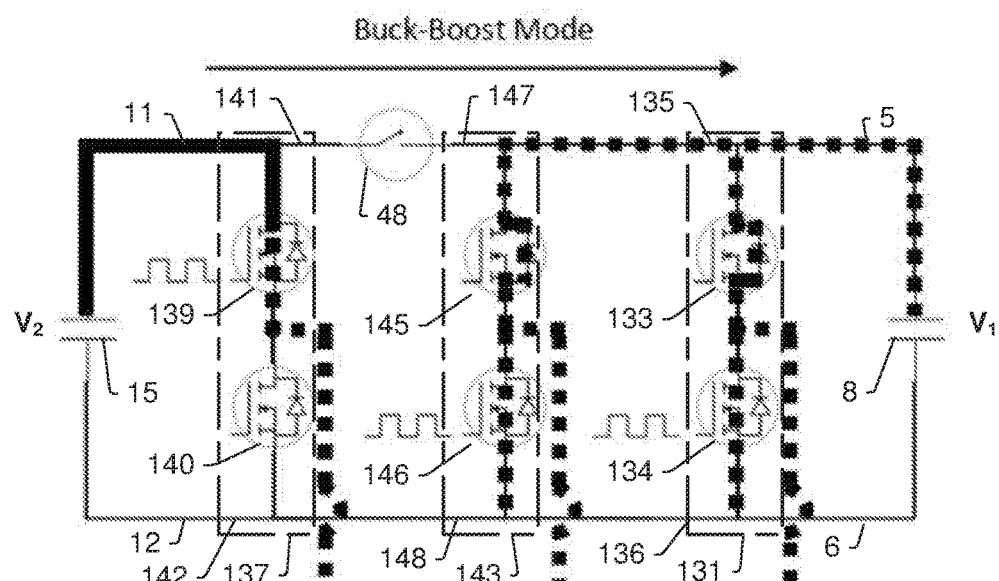
FIG. 10 is an electrical schematic diagram of the controller of FIG. 7 operating in the second state and in a buck-boost mode.
Figure 10:
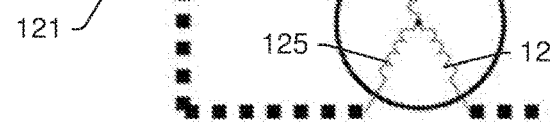

Reference is now made to FIG. 10 where controller 121 is illustrated as operating in the buck-boost mode. This typically occurs when $V_1$ and $V_2$ are close in value, and where changes in both during the charging can have those values crossing each other a number of times. In this embodiment the buck-boost mode to charge $V_1$ from $V_2$ is achieved by module 20 providing respective PWM control signal to the gates of MOSFET 139 (the buck switch) and the gates of MOSFETs 134 and 146 (the boost switches). To increase or maintain maximum current during the conducting phase of these switches, module 20 controls the buck and boost switches together such that when MOSFETs 134 and 146 are turned ON, MOSFETs 139 is also ON. The buck operation of MOSFETs 139 is also able to be used to reduce the current applied in the boost phase. MOSFETs 134 and 146 are able to be operated in phase shifted operation, and MOSFETs 133 and/or 145 are able to be toggled (depending on the switch type) to reduce forward voltage drop. In the case that MOSFETs 133 and/or 145 are toggled, MOSFET 139 is preferentially also inversely toggled to prevent reverse current flow. MOSFET 140 is able to be inversely toggled to provide synchronous buck operation and reduce forward conducting losses of the body diode of MOSFET 140.

It will be appreciated that this Buck-boost mode is able to enter periods of purely buck mode or purely boost mode to achieve the desired charging performance.

It will be appreciated that in the second state, controller 121 is able to act as a four-switch non-inverting cascaded buck-boost converter, and therefore use any known control method for this or similar topologies.

The embodiments of the invention are applicable not just to vehicles, but to any application which has both:

One or more coupled energy storage devices.

An inductive load, or an electric motor which is able to be connected to two or more power sources/sinks.

The one or more coupled energy storage devices typically generates electricity (electrical current) from the stored energy and is able to include one or a combination of: one or a bank of batteries; one or a bank of capacitors; one or a bank of ultra-capacitors; one or more fuel cells; one or more kinetic energy recovery systems; and the like.

The electric motor is connected to the external power source typically via a plug and/or cabling. However, in other embodiments use is made of wireless power transmission.

Figure 11:
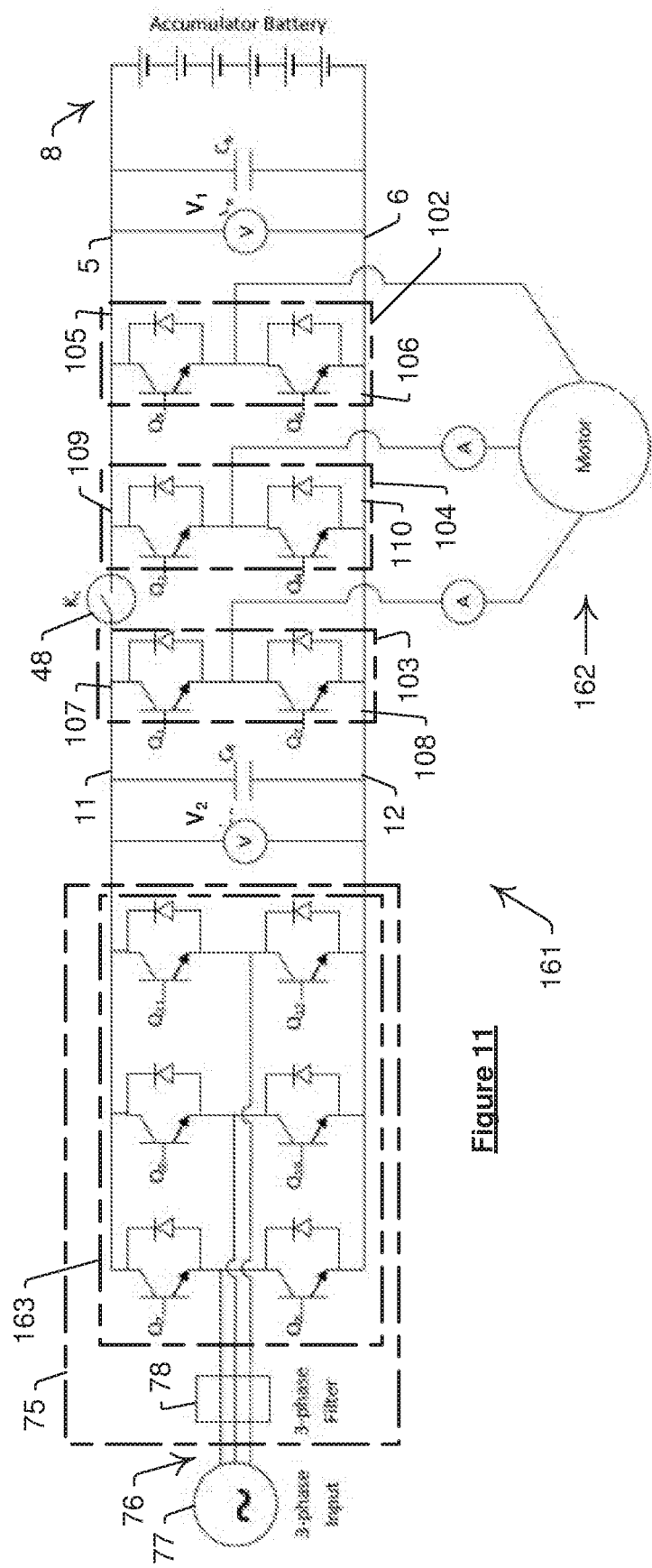
FIG. 11 is a schematic diagram of a controller similar to the controller of FIG. 6 making use of a bidirectional rectifier/inverter.

Reference is now made to FIG. 11 where there is schematically illustrated a controller 161 for an inductive load in the form of a three phase motor 162. This controller 161 is similar to controller 101 of FIG. 6, and corresponding features are denoted by corresponding reference numerals. In FIG. 11, controller 161 is configured to connect with grid 77 which provides an AC source of electrical energy and to accommodate bi-directional V2X operation. Accordingly, the 3-phase rectifier 79 of FIG. 6 is replaced with a 3-phase inverter 163. The control strategy executed by module 20 (not shown) by issuing the relevant control signals is the same as described above with reference to FIG. 10 although with the current flows being reversed and the buck switches and the boost switches being reversed.

The operation of controller 161 is as follows. Firstly, with switch 48 in its open state (as illustrated) controller 161 determines if the voltage across batteries 8, that is, $V_1$, is higher than the peak of the intended AC inverted or DC output voltage. If so, module 20 issues control signals such that controller 161 provides the voltage required for V2X functionality by entering into a buck mode. However, if $V_1$ is less than the peak of the intended AC inverted or DC output voltage then controller 161 will provide the voltage required for V2X functionality by entering into a boost mode. If $V_1$ is close to the peak of the intended AC inverted or DC output voltage then the V2X functionality is able to be implemented by controller 161 operating in a Buck-boost mode.

In this embodiment, module 20 is responsive to the voltages $V_1$ and $V_2$ (as illustrated in the Figure) to determine the mode required by controller 161. Additionally, a feedback loop is derived using the illustrated ammeters on the motor phase connections to allow module 20 to control circuits 102, 103 and 104 such that the current flow in those windings is carefully regulated. In other embodiments module 20 makes use of other inputs, instead of or in addition to the above inputs, for deriving the control signals.

When controller 161 is operating in the buck mode from $V_1$ to $V_2$, module 20 applies a control signal in the form of a PWM signal to the gates of switches $Q_3$ and/or $Q_5$ (which will be denoted as "$Q_{3/5}$"). As the voltage $V_1$ is higher than $V_2$, a current will pass through the freewheeling diode (FWD) of $Q_1$. When $Q_{3/5}$ is turned from an ON to an OFF state, a current will continue to flow due to the inductance in motor 162. This current is able to be supplied by the freewheeling diode (FWD) of $Q_{4/6}$ (where use is made of asynchronous operation) or $Q_{4/6}$ proper when $Q_{4/6}$ is inversely toggled to $Q_{3/5}$ (where use is made of synchronous operation and the switch type allows for bidirectional operation).

When controller 161 is operating in the Boost mode module 20 issues control signals that results in $Q_{3/5}$ being constantly ON. Module 20 issues a further control signal, in the form of a PWM signal, to the gate of switch $Q_2$.

In other embodiments, where the switch 48 is located between the positive power rails 105 and 109 of circuits 102 and 104 respectively (that is, between $Q_2$ and $Q_5$) a multi-inductance boost mode is able to be implemented by applying a PWM signal to gates $Q_2$ and/or $Q_4$.

When controller 161 is operating in the buck-boost mode module 20 applies a control signal in the form of a PWM signal to the gates of the buck switches $Q_{3/5}$ and the boost switch $Q_2$. The buck operation in this mode is able to be performed in either synchronously or asynchronously.

If more phases are available and one or more additional switches 48 are used between the power rails of those phases, multiple buck or boost inductances are able to be realised. Similarly, if the configuration of the phases is able to be changed on demand between a delta and a wye configuration, other inductances are possible.

When operating in any of the modes set out above a DC voltage will be developed at terminals 11 and 12 and across $C_r$. Once module 20 assesses that the voltage has reached a predetermined level it issues control signals to inverter 163 to invert the voltage to single or 3-phase AC waveform at the required voltage and frequency. Alternatively, if grid 77 defines a DC grid, module 20 issues control signals to inverter 163 to operate so as to pass DC power of any polarity to input 76.

When controller 161 (and in particular module 20) operates circuit 163 as a bi-directional rectifier/inverter this has the added benefit of being able to provide active rectification during the charging of batteries 8. That is, in addition to providing the charging functionality, module 20 is also able to improve the power factor of controller 161 and to reduce the harmonics generated. To achieve very low harmonics and near unity power factor, and/or to meet THD requirements, filter 78 is employed between the active rectifier/inverter 163 and the grid 77. In some embodiments, filter 78 includes one or more inductors at its input. These inductors are also able to act as individual phase boost inductors to the input of the rectifier. In this embodiment filter 78 is a passive filter, although in other embodiments active elements are also used. In further embodiments different filters and/or rectifier/inverters are used, not all of which are compatible with full bidirectional operation of the controller.

It should also be noted that while the above embodiments make use of the inductance of the motor to provide various advantageous functions, it is also open to additionally operate the controller such that the motor inductance is not used. For example, in some embodiments, the controller allows an external DC source (such as an external DC charger) to bypass the inductance of the motor to allow direct charging of the batteries. This allows the resultant controller to be fully compatible prospectively or retrospectively with a larger range of charging methodologies and hardware.

The selective connection and disconnection of the power rails of the drive circuits described above also opens up additional design freedoms and allows for further new combinations and advantages to be for gained. For example, by making use of the multiple bidirectional buck-boost functionality it becomes possible to incorporate into a motor controller one or more ultra capacitor banks to help with high power transients and to enable a lower peak power battery chemistry to be used as the main energy accumulator. The energy stored in a capacitor (and a ultra-capacitor or the like) is defined by the equation:

$$E = \frac{1}{2}CV^2$$

Figure 12:
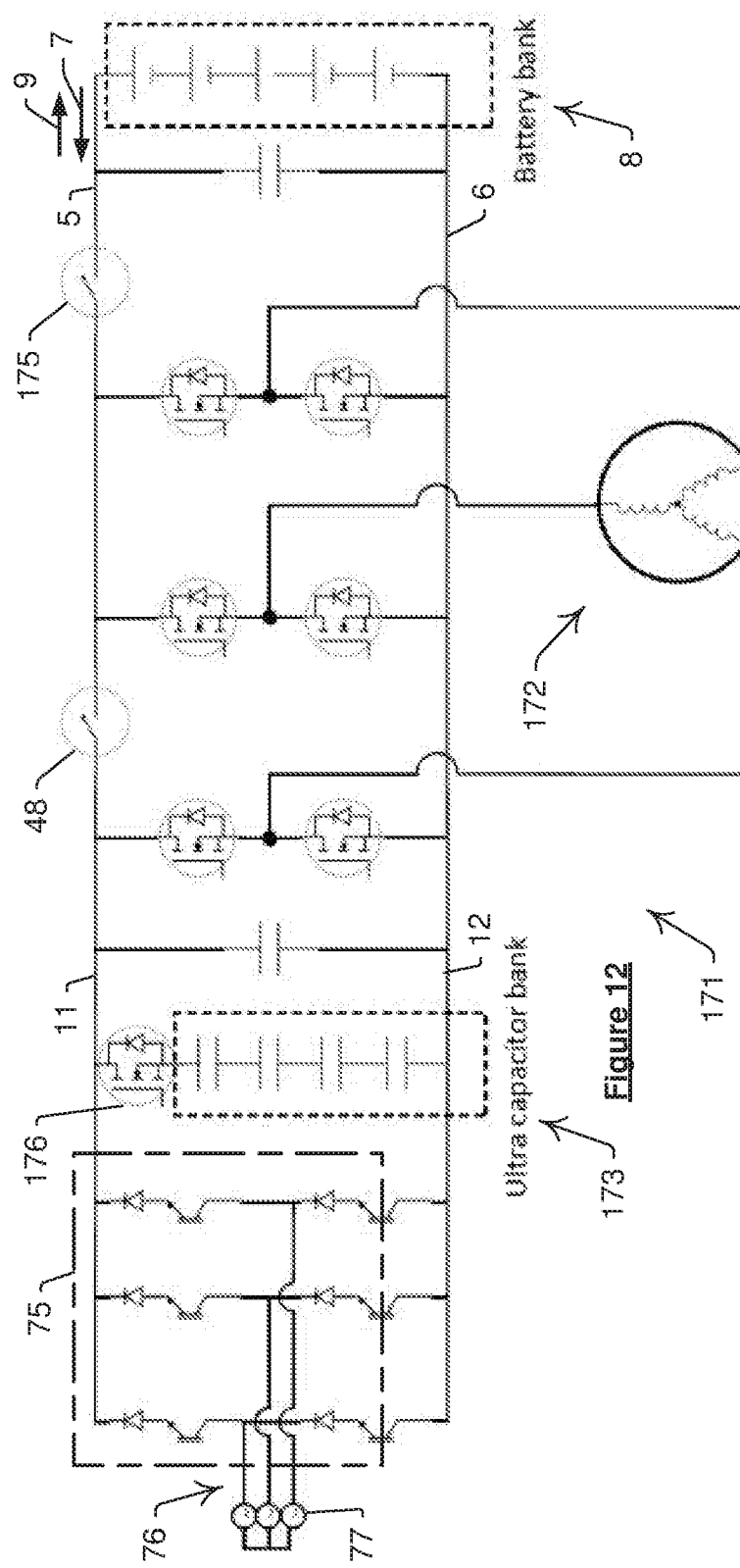
FIG. 12 is a schematic diagram of a controller making use of a plurality of banks of ultra-capacitors (or supercapacitors), with only one bank shown.

To extract maximum energy from the capacitor the capacitor voltage needs to be able to change as much as possible. Accordingly, the inventor has found considerable advantages arising by combining capacitive devices with the bidirectional Buck-boost functionality used in embodiments of the present invention. That is, these Buck-boost functionalities accommodate not only a wide range of voltages but different voltages in different parts of the controller. An example of a controller that takes advantage of this design freedom is provided in FIG. 12, where corresponding features are denoted by corresponding reference numerals. In this embodiment, a controller 171 for an electric vehicle (not shown) regulates not only the drive provided to a three phase wye configured motor 172, but also regulates the power transfer (charging and discharging) of the vehicles on-board DC power sources in the form of the bank of batteries 8 and a bank of ultra-capacitors 173. During those periods when motor 172 is not being used to propel the vehicle—for example, when the vehicle comes to a halt at a traffic light and current 7 drawn by the drive circuits is effectively zero—module 20 (not shown) is able to issue control signals to switch 48 to more to its open state (as shown) and to the switches in the three drive circuits to allow a current to be drawn from ultra-capacitors 173 to generate current 9 that is provided via terminals 5 and 6 to increase the charge of batteries 8. If the voltage provided by ultra-capacitors 173 across terminals 11 and 12 falls below the voltage of the batteries across terminals 5 and 6, module 20 generates control signals to the drive circuits to provide the boost functionality. Once module 20 determines that batteries 8 are fully charged, it generates a control signal to which a switch 175 is responsive to temporarily disconnect batteries 8 from the remainder of controller 171. In this configuration, module 20 is also able to progress switch 48 to its closed state and drive motor 172 through use of the three cooperating drive circuits drawing drive power directly from ultra-capacitors 173. This will result in the voltage provided by ultra-capacitors 173—and hence the voltage across terminals 5 and 6—progressively decreasing. Once this voltage reaches a point that it no longer adequately supports the required energy needs of motor 172, module 20 moves switch 175 to its closed state (while also moving a switch 176 to its open state) to then draw current 7 from batteries 8 such that batteries 8 provide all the energy required to the drive circuits.

It is not unusual for an electric vehicle to experience, between periods where the electric motor is providing locomotive drive, periods of deceleration where use is made of regenerative braking. When transitioning between a period of drive for motor 172 and a period of regenerative braking, module 20 in some embodiments changes the state of switches 175 and 176 such that batteries 8 are again isolated from the remainder of controller 171 and the regenerative braking current developed by motor 172 is directed into ultra-capacitors 176. This takes advantage of the high power capability of ultra-capacitors. Should module 20 assess that the ultra-capacitors 173 are reaching at state of full charge control signals are issued to direct the regenerative braking current to batteries 8. In either case, should the vehicle come to a complete stop following this braking, module 20 is again able to further charge batteries 8 from ultra-capacitors 173 using the buck-boost mode described above.

In some embodiment module 20 acts to retain a predetermined minimum voltage across ultra-capacitors 173 to reserve a store of on-board energy to supply peak power demands of motor 172. In such embodiments, once the voltage across ultra-capacitors 173 falls below the predetermined minimum after having supplied such a peak power demand, switch 176 (which in FIG. 11 is exemplary illustrated as a MOSFET device) is partially or fully progressed to an open state to regulate the flow of electrical energy into ultra-capacitors 173. This flow of energy into ultra-capacitors 173 preferentially occurs when power demand by motor 172 is low or zero. Separately, switch 175 is able to be pulsed—that is, progressed between its open and closed states in response to PWM control signals provided by module 20—to also contribute a chopped current 7 to supplement the current provided to motor 173 (via the drive circuits) by ultra-capacitors 173 during any period of peak power demand.

In some embodiments it is preferential to have ultra-capacitors 173 fully charged whilst the vehicle is stationary to prepare for an anticipated high or peak power demand associated with the acceleration of the vehicle from stationary. This is because capacitors generally have higher power density and a lower energy density than commonly achieved with battery chemistries. In such cases, the energy recovered from regenerative braking—that is, from kinetic energy converted into electrically energy during the deceleration of the vehicle—would be stored in ultra-capacitors 173 by closing switch 176 and opening switch 175. If, during this recovery operation, ultra-capacitors 173 become fully charged, switch 175 is able to be closed to direct any subsequently supplied energy into pack 8. If all possible kinetic energy is recovered and ultra-capacitors 173 are less than fully charged, module 20 (not shown) is able selectively to charge the ultra-capacitors 173 from pack 8. The latter is enabled by opening switch 48 and closing switches 175 and 176. That is, module 20 (not shown) switches the relevant drive circuits, as previously described, to implement selectively one or more of buck, boost and buck-boost operations. Once ultra-capacitors 173 are charged to the selected upper level, or the vehicle needs to generate tractive effort, switch 175 is opened and switch 48 is closed such that motor 172 operates solely from the energy stored in ultra-capacitors 173. Once ultra-capacitors 173 discharge a predetermined amount, switch 175 is progressively pulsed to provide additional energy from bank 8. That is, the motor is drawing energy from both ultra-capacitors 173 and bank 8. Once ultra-capacitors 173 reach a predetermined minimum level of charge, switch 176 is fully opened, and switch 175 fully closed, such that all required energy is now sourced from bank 8. Filter circuits are also able to be employed to smooth any pulsed current from the use of switches 175 and/or 176 with PWM.

The use of ultra-capacitors 173 (or the like) also allows for rapid charging due to their high power density and tolerance to high charge and discharge rates. This is particularly applicable for vehicle applications making use of frequent stops, such as an electric bus. Once stopped, a high power DC or AC source (through input circuit 75) is able to rapidly charge ultra-capacitors 173. Simultaneously, module 20 generates control signals to operate the buck-boost capabilities of controller 171 to provide a top-up charge to batteries 8. For instances where a DC source is used, it is preferentially interfaced directly to terminals 11 and 12 (or one or more of the power rails of controller 171) to bypass the losses of any input circuit 75. Once the charging is complete, or the vehicle moves from the charging point, ultra-capacitors 173 are able to contribute in full or in part to driving motor 172. Alternatively, or additionally, ultra-capacitors 173 are able to continue charging batteries 8 through the Buck-boost capabilities of controller 1 whenever the vehicle is stopped and until ultra-capacitors 173 are depleted or the voltage is reduced to the predetermined minimum. Once ultra-capacitors 173 are depleted between stops they are available to be charged from batteries 8, or by motor 172 during regenerative braking.

Figure 13:
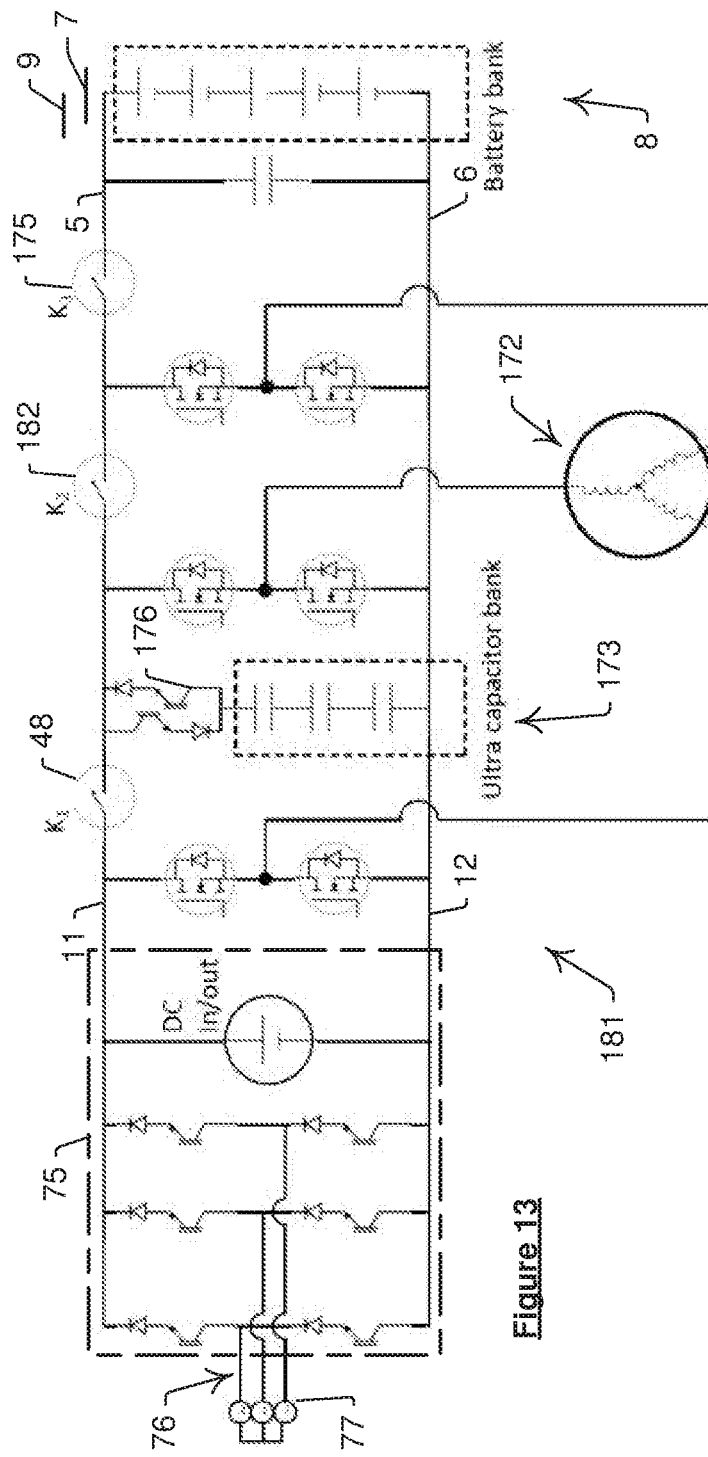
FIG. 13 is a schematic diagram of a further controller making use of a plurality of banks of ultra-capacitors.

A further embodiment of the invention making use of ultra-capacitors is provided in FIG. 13, where corresponding features are denoted by corresponding reference numerals. Controller 181 includes a bank of ultra-capacitors 173 located between two of the drive circuits and an additional switch 182 that is responsive to control signals from module 20 (not shown). This allows for controller 181 to perform the power and voltage conversion required to charge ultra-capacitors 173 from an external source at input terminals 11 and 12. Ultra-capacitors 173 are intended to operate at voltage different to the rectified AC input voltage at terminals 11 and 12 and the voltage provided by battery bank 8 at terminals 5 and 6. However, in other embodiments ultra-capacitors 173 operate at a similar voltage to one of the voltages at terminals 11 and 12 or terminals 5 and 6. When switch 48 and 182 are in their open states while input 76 is connected to grid 77 and charging current 13 is being provided at terminal 11 and 12, the charging of ultra-capacitors 173 is able to occur at a different rate and at a different voltage to the charging of batteries 8. In this embodiment switch 176 takes the form of two sets of IGBTs with inline diodes set in head-to-tail in parallel. This switch is responsive to control signals from module 20 (not shown) to assist in controlling the current flow to and from ultra-capacitors 173. Therefore, power/energy is able to be transferred in twelve directions with combinations thereof. That is, in the first state, the motor is able to power or be powered by any combination of the ultra-capacitors 173, battery bank 8, and/or a second input. In the second state, DC-DC power/energy is able to be transferred bi-directionally between any one or all combinations of the battery bank 8, the ultra-capacitors 173, and the second input source. It will be appreciated, given the benefit of the teaching herein, that many other configurations are possible for the location of the ultra-capacitors or for the use of multiple banks of ultra-capacitors or other storage media.

Figure 14:
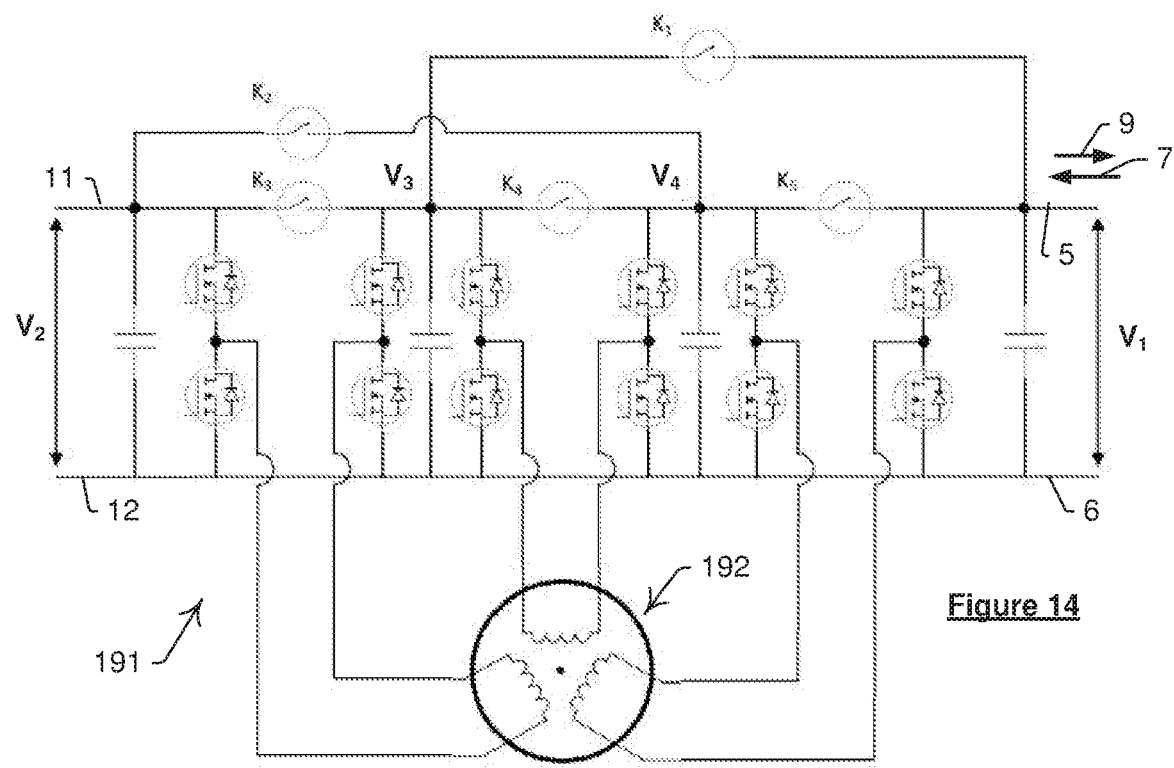
FIG. 14 is a schematic diagram of a further controller for an inductive load in the form of a switched reluctance motor, or a motor with independently controlled windings.

A further embodiment of the invention is illustrated in FIG. 14 where corresponding features are denoted by corresponding reference numerals. In this embodiment, a controller 191 for an inductive load in the form of a switched reluctance motor 192 includes five switches $K_1$ to $K_5$ that are responsive to control signals from module 20 (not shown) for selectively connecting and disconnecting the supply rails betweens the three drive circuits for the three windings of motor 192. That is, embodiments of the invention also extend to motors having independently driven motor coils. In this embodiment, each drive circuit includes an H-bridge for providing drive current to the relevant coil. In other embodiments, an asymmetrical H-bridge is used. Through selective interruption of the power rails between those H-bridges it becomes possible to use the individual windings in motor 192 to translate the available DC source voltages in series, or to act in parallel, or a combination of series and parallel. When acting in series all switches $K_1$ to $K_5$ are in their open state as shown, and the voltage is translated from terminals 5 and 6 to terminals 11 and 12, or the converse, by controller 191 operating each coil independently in a buck mode, a boost mode, or a Buck-boost mode. When charging batteries 8 from another DC source 15 at terminals 5 and 6, the voltage is translated in steps from $V_2$ to $V_3$ to $V_4$ to $V_1$. As varying levels of voltages are accommodated within controller 191, additional energy storage is also able to be implemented at those intermediate levels (for example, using ultra-capacitors).

When operating in parallel, $K_1$, and $K_2$ are closed and $V_2=V_4$, and $V_3=V_1$. Accordingly, the input and output voltage of each buck, boost, or buck-boost configuration is the same. This allows controller 191 to increase the efficiency and/or power transfer during specific charging requirements.

Although the above embodiments have been described with reference to a single phase or three phase examples, it will be appreciated that the invention is applicable to motors having a different number of phases.

Figure 15:
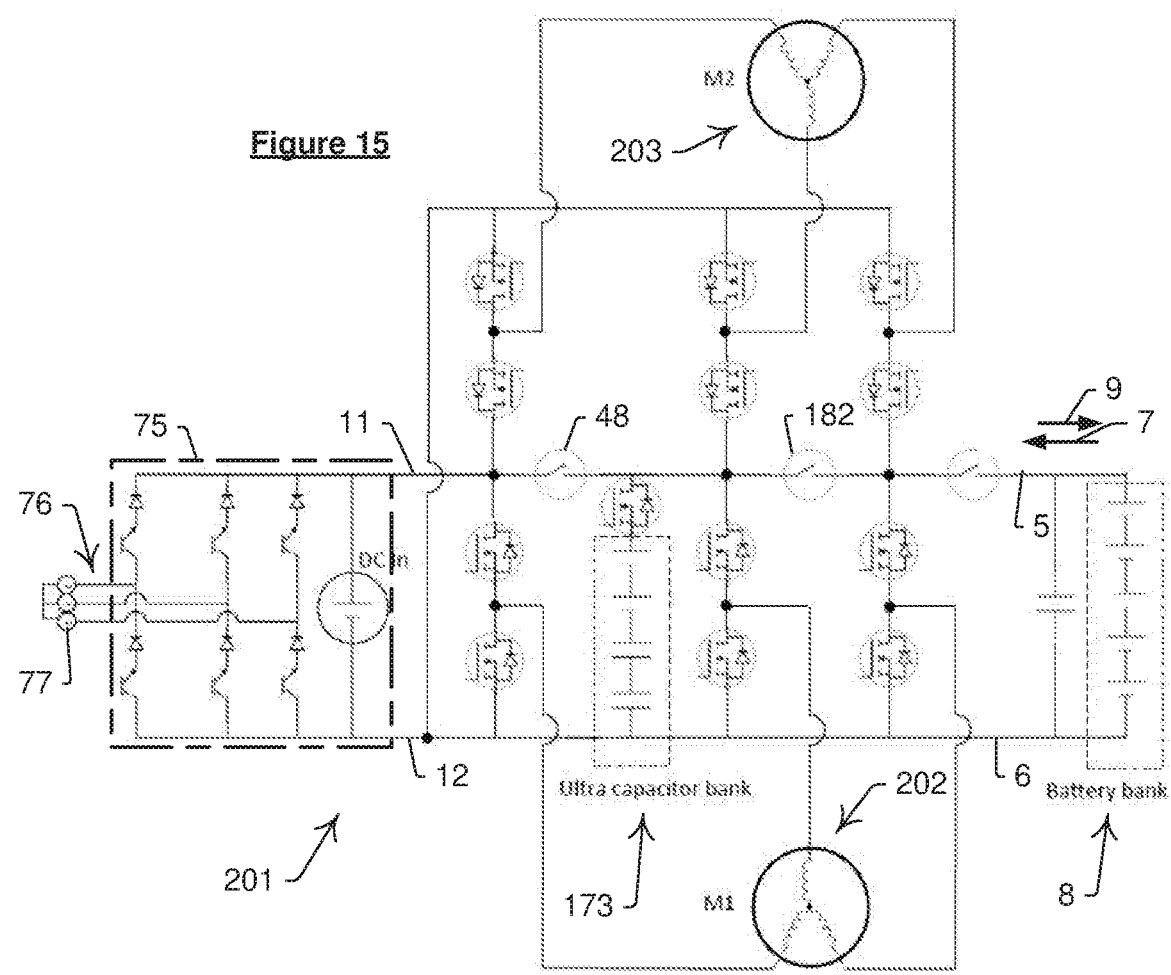
FIG. 15 is a schematic diagram of a further controller for an inductive load including multiple electric motors.

In FIG. 15 there is illustrated another embodiment of the invention where a controller 201 is for an inductive load in the form of two three phase motors 202 and 203. In other embodiments more than two motors are included. Both motors in this embodiment (or in other embodiments, all motors) are able to be used to provide voltage translation and bi-directional operation. As the power rails for each stage of voltage translation is arranged in parallel, the charging power is able to increase with each added motor and its associated drive circuits. In FIG. 15, motors 202 and 203 are connected to allow for high power charging as both motors and the associated power electronics—that is, the associated drive circuits—are able to be used to regulate the power flow between the two sets of terminals. When cost considerations are paramount, use is made of the same power rail switches 48 and 182 for the drive circuits for both motors. In other embodiments, the power rails of the drive circuits of the respective motors are not connected and include their own power rail disconnection switches, therefore allowing the respective drive circuits and buck-boost functions to operate independently.

In the FIG. 15 embodiment the rectified 3-phase power from grid 77 results in a DC voltage at terminals 5 and 6 that is translated by controller 201 to a voltage across ultra-capacitors 173 and/or a voltage across batteries 8. Controller 201 is able to operate bi-directionally to supply DC output voltage at terminals 11 and 12, or to invert that DC voltage to an AC signal at input 76 if an inverter rectifier is used in circuit 75.

Figure 16:
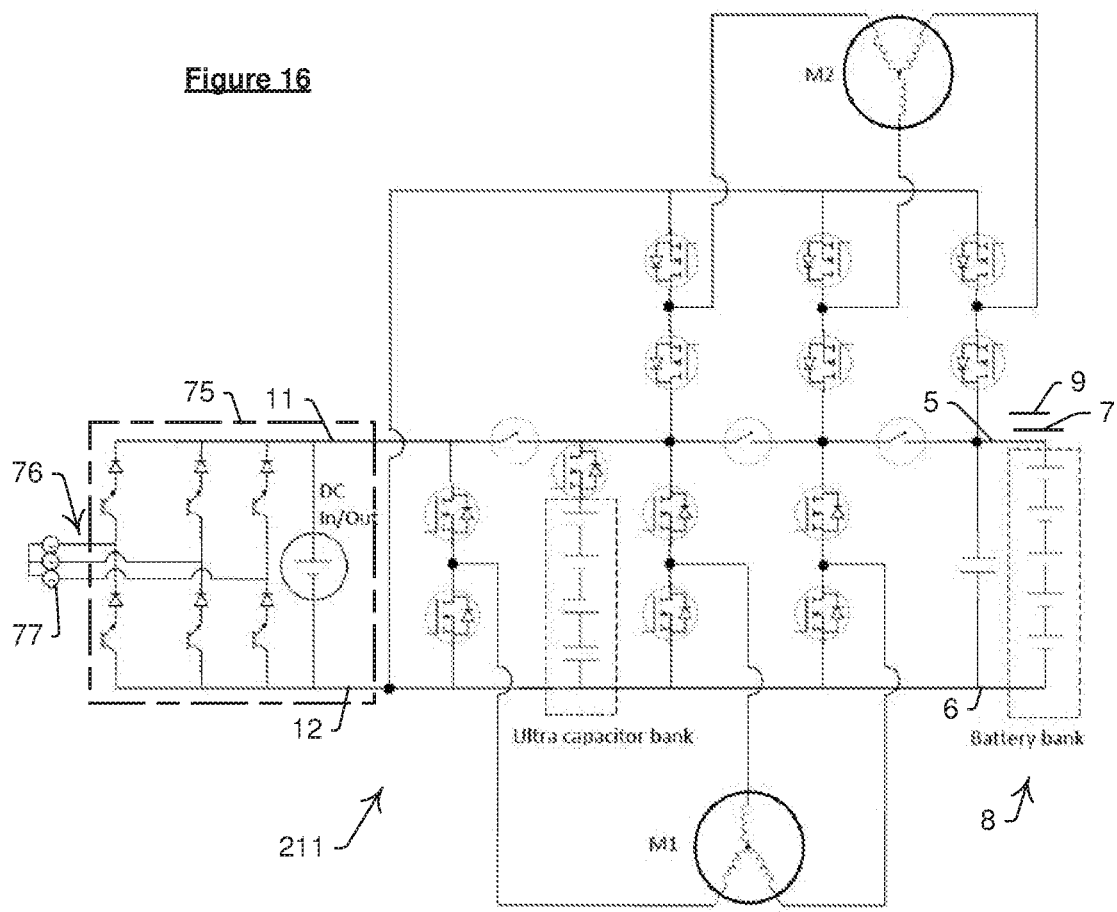
FIG. 16 is a schematic diagram of a further controller similar to that of FIG. 15 and having staggered connections.

In another embodiment, illustrated in FIG. 16, motor 203 is staggered across different decoupling switches to motor 202 so that module 20 (not shown) is able to control the switches to varying the inductances used to charge/discharge batteries 8 and ultra-capacitors 173.

Figure 17:
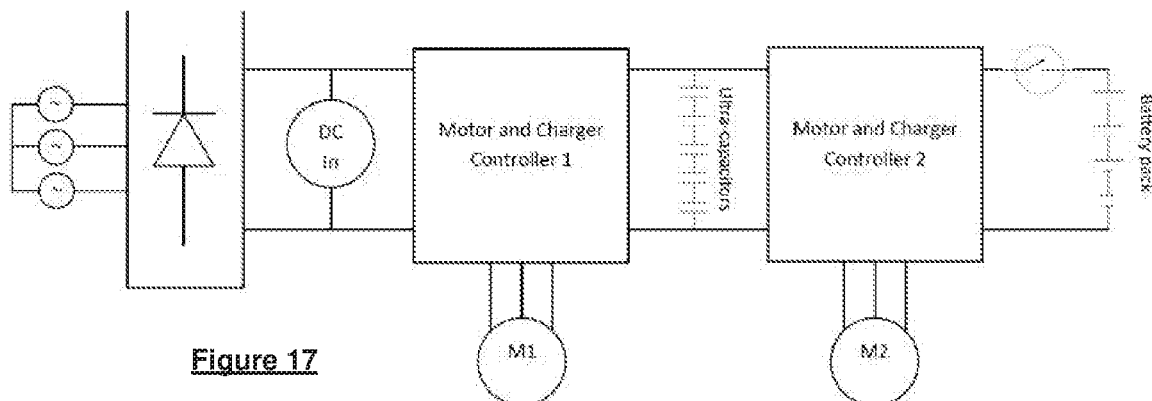
FIG. 17 is a schematic view of a further controller for an inductive load including multiple electric motors.

A series format for those embodiments making use of multiple controllers and motors and which draws upon two forms of on-board energy storage (such as batteries and ultra-capacitors) is illustrated in FIG. 17. Between the controllers for the two motors there is provided an independent voltage at which to operate an energy storage device such as a bank of ultra-capacitors, or another input/output terminal to interface with an external source. During a charging mode a high power DC source or a rectified 3-phase AC source provides an input voltage that is translated through the first controller and onto the ultra-capacitors. From this independent voltage, the second controller is able to translate to a second voltage to charge the batteries. As the ultra-capacitors are able to charge and discharge at a higher rate than batteries, the charge and discharge levels will typically differ considerably between the two storage devices. This system topology enables many modes of operation. For example, if the main switch for connecting and isolating the batteries is in its open state (isolated the batteries from the remainder of the controller), both motors are able to drawn energy stored on the ultra-capacitors. If that main switch is in its closed state the motors are able to draw energy from either or both of the batteries and ultra-capacitors. Through the use of the inductance provided by the second motor, the ultra-capacitors are able to be used to continue charging the batteries, or vice versa, even after the external power source is removed. The ultra-capacitors, the batteries, or a hybrid of both, are available to provide vehicle-to-grid (V2G) or DC output operation.

The controller of FIG. 17 is illustrated schematically and it will be appreciated by those skilled in the art that various components have been omitted for the sake of clearly illustrating the overall architecture and design concept. When implemented the controller is able to include further components to enable specific operation, as would be appreciated by those skilled in the art.

In other embodiments, use is made of other energy storage devices at the independent voltage. In further embodiments, a further AC or DC input/output terminal is located at the independent voltage. This may include interfacing another input circuit, such as for optimising rectification for single or three phase AC.

For those embodiments making use of V2G functionalities, and/or other operations which are able to provide benefit to the grid, it is preferred that use is made of a high life cycle energy storage medium such as a bank of ultra-capacitors or the like, such as those presented in FIG. 17. This enables the system to provide benefits to the grid and or user without significantly depreciating the components within the system. These benefits are able to take place in providing demand response, voltage and/or frequency regulation, load shedding, and/or phase balancing, of any one or more phases of the connected electrical grid. The embodiments of the controllers described in this specification are configured for easy integration with ultra-capacitors or the like, with bidirectional voltage and power translation between the batteries and/or ultra-capacitors and/or electrical grid, and therefore making bidirectional and/or V2G capabilities a viable and potentially profitable technology.

Figure 18:
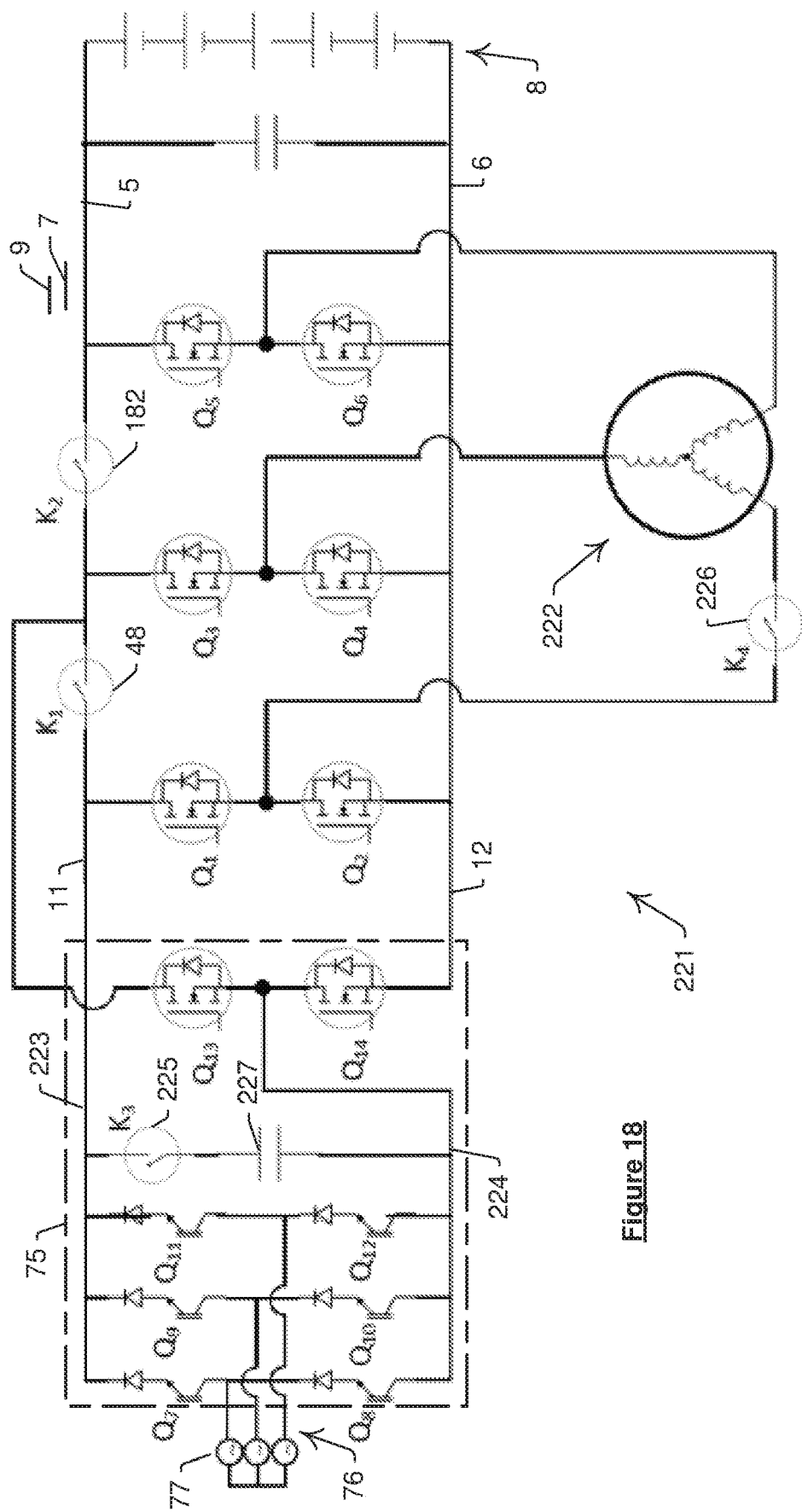
FIG. 18 is a schematic diagram of a further controller for an active rectifier with bidirectional capabilities coupled with an inductive load in the form of a three phase motor having three windings shown in a wye configuration.

Reference is now made to FIG. 18, where corresponding features are denoted by corresponding reference numerals. A controller 221 for an inductive load in the form of a three phase motor 222 provides for bidirectional translation of electrical energy. In particular, controller 221 includes two spaced apart switches 48 and 182 for breaking the positive power rail twice. That is, in the first state the three drive circuits have common power rails and operate in unison to selectively allow current flows through the winding of motor 222 to create positive or negative torque in the motor. However, in the second state, the three drive circuits are each able to be isolated from each other to enable a bi-directional buck-boost converter using, in input circuit 75, an otherwise unidirectional rectifier. In this embodiment input circuit 75 is unidirectional (as is preferential in some embodiments) to allow controller 221 to draw from grid 77 a sinusoidal input current at a high power factor, and a low total harmonic distortion (THD). As illustrated in FIG. 18, the series configuration of IGBTs $Q_7$ to $Q_{12}$ and the respective inline diodes defines six unidirectional switches which are able to be controlled by module 20 as buck switches to control the current rectified through the input circuit 75 from each individual phase of grid 77. This provides controller 221 with greater current control on each phase when charging batteries 8. However, it does not provide a current path for V2G operation when controller 221 acts in a bi-directional capacity. Instead, to supply current back to grid 77, the polarity of two supply rails 223 and 224 within circuit 75 are reversed to that of batteries 8.

During the second state—which in this embodiment defines a charge mode for batteries 8—switches 48 and 225 and MOSFET $Q_{13}$ are in their open states, while switches 182 and 226 and MOSFET $Q_{14}$ are in their closed state. During buck operation, $Q_1$ is operated as a buck switch, with $Q_2$ being used in synchronous operation. During boost operation, $Q_4$ and $Q_6$ are toggled. In another embodiment, during boost operation, switch 48 is in its closed state and switch 182 is in its open state, and MOSFETs $Q_1$ and $Q_3$ act as the buck switches while MOSFET $Q_6$ acts as the boost switch.

During bidirectional V2G operation: switches 48, 182, 226 and MOSFET $Q_{14}$ are in their open states, while switch 225 and MOSFETs $Q_1$, $Q_2$, and $Q_{13}$ are in their closed states. MOSFETs $Q_5$ and $Q_6$ are used as the buck and synchronous buck switches respectively, while MOSFET $Q_4$ is used as the boost switch. Switch 48, and MOSFETs $Q_1$, $Q_2$, and $Q_{13}$ act to reverse the polarity of supply rails 223 and 224 so that circuit 75 is able to invert an AC output into the electrical grid 77. During the second state, where terminals 11 and 12 are drawing current from grid 77, MOSFET $Q_{13}$ and either/both of switches 48 and 182 are in their open state and MOSFET $Q_{14}$ is in its closed state, such that terminal 6 is connected to rail 224 via $Q_{14}$. During bidirectional operation, MOSFET $Q_{13}$ is in its closed state, and MOSFET $Q_{14}$ and switch 48 are in their open states such that terminal 5 is connected to rail 224. MOSFETs $Q_1$ and $Q_2$ are in their closed states so that terminal 6 is functionally connected to terminal 11. This operation reverses the polarity of the relevant terminals and allows the unidirectional switches of circuit 75 to invert the DC power received at terminals 11 and rail 224 and supply that inverted power to grid 77. Switch 225 is used to control the charge and discharge current to and from an inline capacitor 227. This capacitor acts as a decoupling capacitor and energy storage buffer for energy to be inverted in V2X operation.

When circuit 75 is performing rectification of the current drawn from grid 77, switch 225 is in its open state so that the inductance of motor 222 is able to be used to control the input current favourably to ensure a sinusoidal current is drawn from the grid. During bi-directional operation, switch 225 is in its closed state so that capacitor 227 stores and smoothes the buck-boost voltage to provide a more stable voltage for circuit 75 to invert and supply to grid 77.

In another embodiment an additional set of unidirectional switches (IGBTs with respective inline diodes) in circuit 75 are configured inversely (that is, facing an opposite polarity) to IGBTs $Q_7$ to $Q_{12}$ to provide an AC current path without reversing the polarity of rails 223 and 224.

Having two power rail interruptions—in the form of switches 48 and 182—allows for variable buck and/or boost inductance values to be implemented to improve the efficiency of controller 221 at different power and voltage levels. In charging mode, for example, if switch 48 is in its open state and switch 182 and 226 are in their closed state, then the buck inductance provided by the wye configured windings of motor 222 is 1.5 times the individual phase inductance of the windings. If switch 48 is in its closed state and switch 182 is in its open state, then the buck inductance is able to be configured to be 1.5 to two times the phase inductance. Having two independently actuatable power rail interruptions—which in this embodiment takes the form of switches 48 and 182—also allows for independent voltages to be produced between those interruptions. This allows for easy integration of other energy storage mediums at these isolated positions, as has been described in other embodiments above.

Features of other embodiments are able to be included in the FIG. 18 embodiment, such as rectification of the neutral point, or the addition of ultra-capacitors. For instance, rectification including a neutral point is able to occur with each phase at input 76 interconnected with a capacitor network in star configuration (not shown). A capacitor is then able to be connected between the neutral star point and the common point of a drive circuit that is disconnected from the motor. In this specific embodiment, the neutral star point is connected via a capacitor between the drive circuit switches formed by $Q_1$ and $Q_2$. In this example, switches $K_2$ and $K_4$ are held open (in a nonconductive state), and the buck-boost functionality occurs using switches $Q_3$ to $Q_6$.

Figure 19:
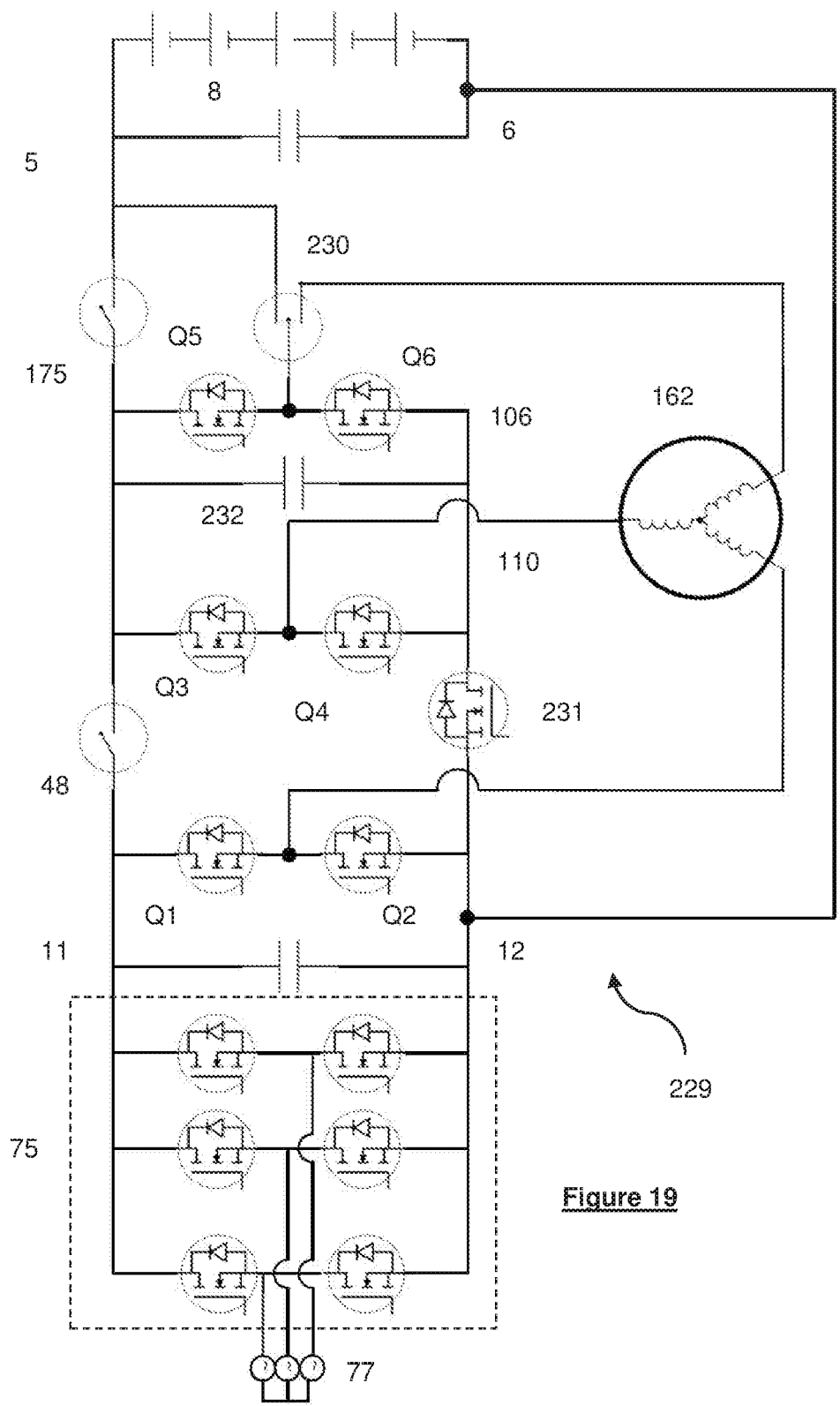
FIG. 19 is a schematic view of a further controller enabled to work as a magnetic energy recovery switch (MERS) system.

Reference is now made to FIG. 19, where corresponding features are denoted by corresponding reference numerals. A controller 229 for an inductive load in the form of a three phase motor 162 uses module 20 (not shown) to work as a magnetic energy recovery system (MERS) during the second state of generating charging current 9 from the second input source. This embodiment is exemplary of a case where it is advantageous to disconnect the negative power rail of one drive circuit from one or more negative power rails of other inputs or drive circuits. During the first state, module 20 issues signals to close switches 48, 175 and 231, and connect the motor phase winding to the centre tap of the first drive circuit 102 via a switch 230. In the second state, module 20 issues signals to open switches 48, 175 and 231, and to connect terminal 5 to the centre tap of the first drive circuit via switch 230. In this embodiment, switch 231 is shown as a MOSFET with FWD and controller 229 allows for a MERS compensation system to form around a capacitor 232, with an inductive series input from the motor winding. This creates an AC switch around the capacitor to allow its selectively inclusion in the circuit to provide compensation and to recover energy from the MERS system. The current through the winding is able to be further modulated through operation of buck switch $Q_1$. In other embodiments use is made of other systems, such as an active rectifier with inline reverse blocking diodes (not shown). Boost functionality is able to be realised by closing $Q_4$ and issuing a PWM signal to switch 231. During the off periods of switch 231, the current through the winding must continue to flow and will therefore charge battery bank 8 through a body diode of $Q_6$ unless the capacitor 232 is switched into the circuit. A voltage sensor is employed in this embodiment to measure the voltage across capacitor 232. The MERS system is able to be used to aid in charging efficiency, THD, PFC, and/or charging ripple current.

Figure 20:
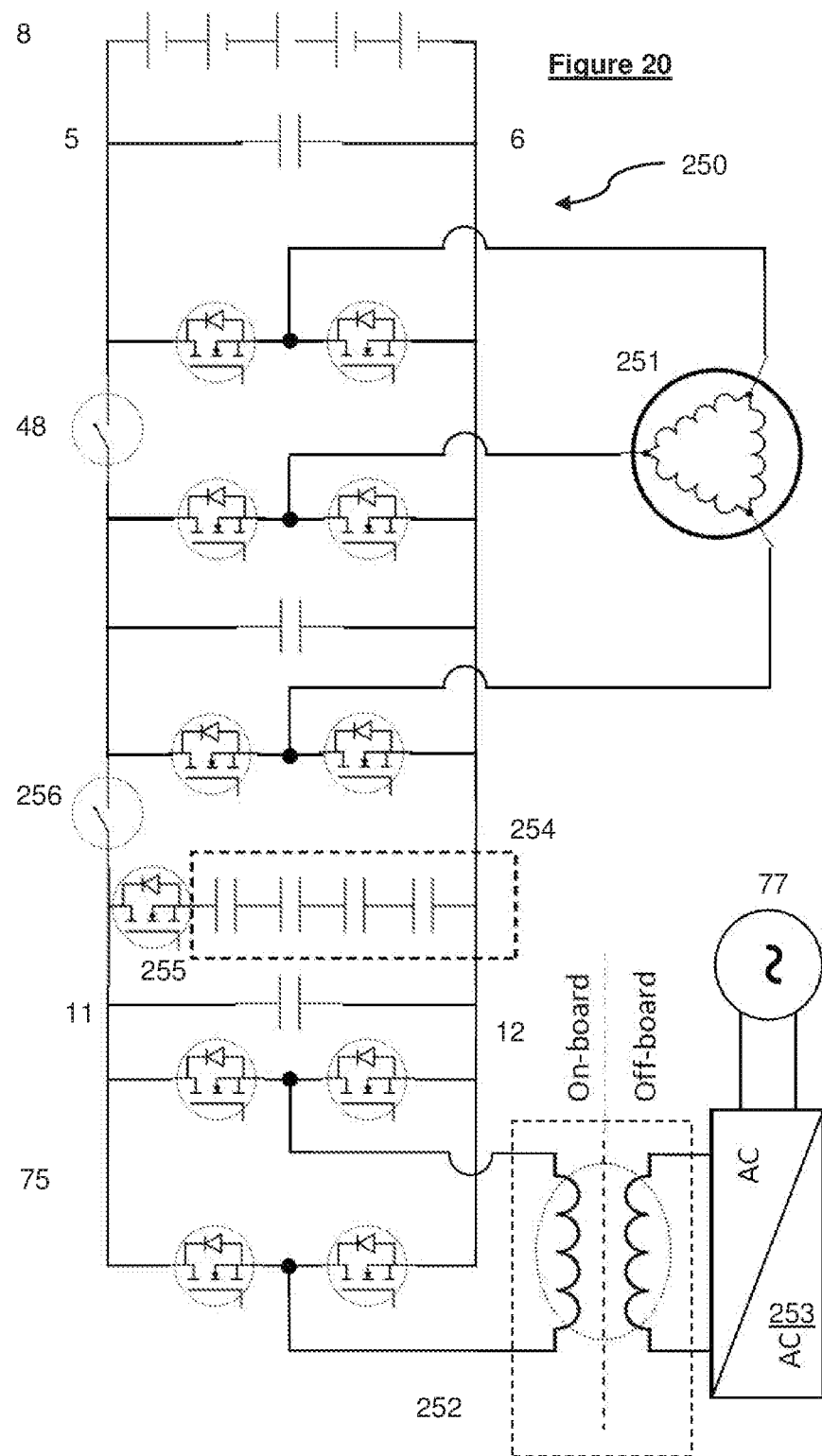
FIG. 20 is a schematic view of a further embodiment of the invention making use of wireless power transfer.

Reference is now made to FIG. 20, where corresponding features are denoted by corresponding reference numerals. More particularly, there is illustrated a controller 250 for an inductive load in the form of a 3-phase motor 251 in delta configuration. Controller 250 uses module 20 (not shown) to control wireless power transfer through a set of wirelessly coupled transducers 252. In this embodiment, the coupled transducers 252 take the form of a primary and secondary transducer, each offering bidirectional transfer, where the off-board transducer is a single high density coil embedded in a paddle. In other embodiments, the off-board transducer is a track loop or a series of coils embedded under the road surface. In this embodiment, the off-board transducer draws energy from a single or three-phase electrical grid through an AC-AC converter 253, and creates a high frequency AC signal. In other embodiments, other AC frequencies and converter types are possible. In further embodiments, converter 253 is a DC-AC converter and the input source is DC, such as a bank of batteries (not shown). As the power transfer is wireless, the on-board transducer is able to interface with many different off-board transducers, including accepting wireless transfer from multiple primary transducers simultaneously. In this embodiment the input circuit 75 includes a bidirectional active rectifier-inverter composed of MOSFETs with anti-parallel diodes. In other embodiments, input circuit 75 includes filtering mechanisms and/or other components required to efficiently rectify the wireless power received from the on-board transducer as would be appreciated by those skilled in the art. Whilst the vehicle is stationary and in the second state, wireless power received is able to be used to charge the bank 8 by keeping a switch 256 in a conductive state and switch 48 (not shown) and/or switch 182 in a non-conducting state and following the buck-boost methods outlined previously. Similarly, as input circuit 75 contains an inverter circuit, bidirectional operation is enabled by generating a high frequency AC in the on-board transducer to be transferred to the off-board transducer for wireless V2G operation. In this embodiment, while the vehicle is moving and making use of the motor for tractive effort, module 20 holds switch 256 in a non conductive state and any received wireless power is able to be rectified onto ultra-capacitors 254. Power flowing in and/or out of ultra-capacitors 254 is able to be controlled by switch 255, represented in this embodiment as a single MOSFET with FWD. In other embodiments switches 255 and/or 256 contain two IGBTs in series having common emitters with freewheeling diodes, or other switching mechanisms. During vehicle operation, module 20 is able to provide PWM drive to switches 256 and/or 255 to selectively charge or discharge the ultra-capacitors 254, and/or send or receive wireless power to/from the on-board transducer. Whilst in the second state, the batteries 8 are able to charge the ultra-capacitors 254, and vice versa, through the buck-boost operations outlined previously. In other embodiments, the coupled transducer coils are replaced by another wireless transfer method, and the input circuit 75 is adapted accordingly to create a DC voltage at the second input terminals 11 and 12. In further embodiments, the coupled transducers 252 are replaced with a wired AC or DC power transfer mechanism and input circuit 75, and off-board AC-AC converter 253, are adapted accordingly. In other embodiments, another on-board transducer is used such that the primary on-board transducer delivers wireless, and therefore isolated, power to the secondary on-board transducer. This secondary on-board transducer is then able to supply, for example, a low voltage (LV) isolated power rail for the general operation of an electric vehicle. This power rail would replace a dedicated 12 Volt or 24 Volt on-board battery, or dedicated DC-DC isolated converter. In other embodiments, the primary and secondary on-board transducers form a transformer, with primary and secondary windings wound around a common core material. In further embodiments, multiple windings or transducers are used to generate multiple isolated power rails, and/or power coupling with external devices, capable of multi-directional power flow.

Features and control methods from any one embodiment are able to be selectively applied to and combined with the features and methods of one or more other embodiments, as would be appreciated by a person skilled in the art, particularly in light of the teaching herein. The omission of any feature or method from any one embodiment is only done to avoid redundancy in the description, not to imply that other combinations are not possible.

In relation to the above preferred embodiments, and other embodiments. it should be noted that:

An inverter or rectifier is able to be replaced to rectify or invert any number of electrical phases.

The switch 48 (or like switch) is able to be located between any of the plurality of like power rails. That is, it is able to be on either the positive or negative power rail.

Multiple (two or more) switches (such as switches 48) are used for breaking the power rails at different points depending on the mode of operation.

Additional inputs/outputs and/or energy storage devices are able to be implemented at each power rail able to be disconnected from another power rail.

Additional or different sensors are able to be used in the controllers to aid the operation of the control module in issuing control signals.

Multiple motor/inverter configurations are available, including single/multiple phase(s) rectified per motor with or without DC-DC isolating converters.

The controller method is able to be employed using a variety of inductive loads of one or more phases set in different configurations such as delta or wye.

One rectifier having one or more motors is able to be controlled to flatten the current load and reduce harmonics.

The rectification and power factor correction is able to occur off-board. In such embodiments the controller typically controls the charging current and either bucks, boosts, or buck-boosts the voltage.

The controller is able to be configured to comply with demand response, load shedding, phase balancing, and/or voltage and/or frequency regulation of each phase.

The controller is able to be optimised to achieve criteria such as efficiency, cost, safety, longevity, reliability, and/or function.

Reference in this specification to vehicles includes a reference to both land-based vehicles and other vehicles such as aircraft and watercraft. Typical examples of land-based vehicles include plug-in electric vehicles and plug-in hybrid electric vehicles. These electric vehicles are not limited to cars, and include also trucks, buses, forklifts, mining equipment, agricultural equipment, recreational vehicles, and others.

Although the above embodiments have been described with reference to inductive loads such as motors, it is also applicable to other inductive loads such as electrical heating elements and electric current conductors with inductance, or to a combination of motors and such other inductive loads.

The main advantages of offered by one or more of the embodiments described above include:

The ability to charge a rechargeable power source from wide range of inputs, including a further DC source, a single phase AC source, and a three phase AC source.

Providing buck functionality (where the second source voltage is higher than the present battery/rechargeable energy source voltage) and/or boost functionality (where the second source voltage is lower than the present battery/rechargeable energy source voltage) and any combination of the two.

Bidirectional DC power flow between two DC sources/sinks, with buck and boost functionality in both directions.

Bidirectional power flow to and from a DC source/sink to both a DC and AC input and output.

Needing minimal extra components above that already required to operate and drive the motor, motors, or other inductive load or loads.

Allows the use of three phase grid AC power to reduce charging times of an electric vehicle to a period comparable with Level 3 DC fast charging.

Enables universal deployment by offering buck, boost and buck-boost functionality.

Accommodates a variety of input voltages and types, including typical electrical grid infrastructure voltages such as 110 V, 240 V, 480 V three phase, and others.

Bidirectional capability allows for vehicle-to-grid, vehicle-to-vehicle, vehicle-to-home, and V2X support for electric vehicles.

Operate efficiently, and without the addition of large or costly components such as dedicated buck/boost inductors.

When coupled with an inverter/rectifier, the input/output becomes a versatile AC input or output, or polarity independent DC input or output.

Allows for varying levels of inductance in voltage translations. That is, use is able to be advantageously made of one or all of a windings to implement one or more DC-DC translations.

Allows for an increase in energy transfer.

Allows for different configurations of poly-phase loads and motors, such as wye or delta configurations.

Increases the efficiency of the charging operation and power conversions.

Allows for the reduction of the ripple in the DC charging current.

Reduces the complexity of the overall circuitry required for an electric vehicle. The small increase in complexity to the controller is offset by the elimination of the need for separate charging circuitry as the same circuits used to drive the motor are used to charge the batteries.

Applicable to a broad range of motors and electrical machines, including brushed and brushless DC motors, single-phase AC motors, multi-phase motors (such as induction motors, asynchronous motors, and permanent magnet synchronous motors), switched reluctance motors, and others.

When used in independently coiled motors (such as switched reluctance motors) the embodiments are able to be advantageously operated to selectively place the windings in parallel or series.

Allows the charge/discharge of other energy storage devices at different voltage levels. That is, it is compatible with ultra-capacitors, MERS and the like.

Allows for multiple voltage inputs and outputs, including voltage outputs independent of the input voltage and the battery voltage. This is enabled by allowing for more than one separation between the power rails of the drive circuits.

Ability to provide power rails of varying levels required by the application. For instance, replacing the low voltage (LV) battery or DC-DC converter of an electric vehicle by supplying the energy requirements of the LV control system power rail.

Ability to interface with external DC chargers by providing a direct connection with the onboard batteries or rechargeable energy source without passing through the inductive load or motor.

The applicability to electric motors which do not drive each winding independently. That is, embodiments are applicable to single-phase or DC motors, and to 3+ phase motors where each phase is linked together in a star or delta configuration.

Avoiding the need for asymmetrical half-bridges in the drive circuits.

Applicable to multiple motor configurations, and able to be implemented in series and/or parallel.

Capable regulating bidirectional power flow with a range of external power sources, including the single or 3-phase AC electric grid, HVDC electrical system, wireless power transducer, unregulated DC energy storage, or external DC charger.

Capable of regulating the input of an external source so as to provide power factor correction, load balancing, demand response, low harmonic distortion, maximum power point tracking (MMPT), and the like.

Capable of regulating bidirectional power flow with external power sources through wired or wireless power transmission.

Ability to adapt the efficiency of operation based on the voltage and power of the translation required, through the select use of control strategy, switching frequency, and variable buck-boost inductance capability.

Ability to optimise the design based on locality and/or intended application

Ability to reduce costs, weight, and component count of a system by consolidating the function of multiple converters within the system into the operation of the proposed controller Ability to improve safety and reliability of a system through component reduction and/or optimisation Eliminating or reducing the requirement for external charging station equipment or apparatus intended for electric vehicle recharging and/or V2X operation.

Reference in the above embodiments to control signals is to all signals that are generated by a first component and to which a second component is responsive to undertake a predetermined operation, to change to a predetermined state, or to otherwise be controlled. The control signals are typically electrical signals although in some embodiments they include other signals such as optical signals, thermal signals, audible signals and the like. The control signals are in some instances digital signals, and in others analogue signals. The control signals need not all be of the same nature, and the first component is able to issue different control signals in different formats to different second components, or to the same second components. Moreover, a control signal is able to be sent to the second component indirectly, or to progress through a variety of transformations before being received by the second component.

It will be appreciated that the disclosure above provides various significant improvements in a controller for an inductive load having one or more inductive windings.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term "coupled" or "connected", when used in the description and claims, should not be interpreted as being limited to direct connections only. The terms "coupled" and "connected," along with their derivatives, may be used. It should be understood that these terms are not intended as synonyms for each other. Thus, the scope of the expression "a device A connected to a device B" should not be limited to devices or systems wherein an output of device A is directly connected to an input of device B. Rather, it means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas or flowcharts provided are merely representative of procedures that may be used. Functionality may be added or deleted from the block diagrams and operations may be interchanged among functional blocks. Steps may be added or deleted to methods described within the scope of the present invention.

The invention claimed is:

1. A controller for an electric vehicle, comprising:
a motor of the vehicle having one or more inductive windings;
a first drive circuit including a first half-bridge rectifier;
a second drive circuit including a second half-bridge rectifier;
a third drive circuit including a third half-bridge rectifier;
wherein the one or more inductive winding is connected across from a midpoint of one of the first, second, or third half-bridge rectifiers to a midpoint of an other of the first, second, or third half-bridge rectifiers;
a first input connected to respective like pairs of positive power rails and negative power rails of the first, second, and third drive circuits in a parallel arrangement;
a first direct current energy source or an onboard battery connected across the first input; and
a control module configured to issue control signals to reconfigure the first, second, and third drive circuits from a first state to a second state;
wherein, in the first state, in response to the control signals, the first, second, and third drive circuits are configured in a first period to drive the motor to propel the vehicle and in a second period to generate a first direct current charging current to re-charge the onboard battery;
wherein said first, second and third drive circuits are connected with the first input and are responsive to the control signals for receiving a load current and selectively energising at least one of the one or more inductive windings; and
wherein, in the second, reconfigured state, the controller comprises:
a second direct current external energy source connected across a second input, to charge the onboard battery, the second input connected across the second drive circuit;
a switch in at least one of the positive power rail and the negative power rail, between the second drive circuit and the first drive circuit; and
a first bulk capacitor across the first input and a second bulk capacitor across the second input;
wherein, in the second state, the switch is open, the second drive circuit is disconnected from the first input, and the control module is configured to operate at least one of the first, second, and third drive circuits, with at least one inductive winding, in a buck convert mode, a boost convert mode, or a buck-boost convert mode from the second direct external power source at a second potential to a first potential in order to charge the onboard battery.

2. The controller according to claim 1, wherein the switch includes one or more switches where the or each switch has at least two states and is responsive to the control signals for selectively progressing the or each switch between the states.

3. The controller according to claim 1, wherein the switch is responsive to one or more of the control signals, from the control module, for selectively connecting and disconnecting one or more of the positive and negative power rails from the second input and at least one or an other of the power rails to and from the first input.

4. The controller according to claim 1, wherein each of the first, second, and third half-bridge rectifiers of the first, second, and third drive circuits includes a respective pair of switches, the switches being responsive to the control signals from the control module for selectively energising at least one of the inductive windings.

5. A controller according to claim 1, wherein at least one of the first, second, and third drive circuits selectively connects at least one of the inductive windings with at least one of the positive and negative power rails.

6. The controller according to claim 1, wherein the motor has a plurality of interconnected inductive windings.

7. The controller according to claim 1, wherein an inductive load is the motor having three inductive windings.

8. The controller according to claim 1, further including:
an alternating current input circuit applied across the second input;
wherein the alternating current input circuit includes an active rectifier suitable for an external, alternating current power source and power factor correction.

9. The controller according to claim 1, wherein the second bulk capacitor is configured to filter a direct current voltage potential of the external power source or an output of the alternating current input circuit when the controller is configured in the second state.

10. The controller according to claim 9, wherein the second bulk capacitor, when the controller is configured in the first state, is configured to filter a voltage potential applied to the motor.

11. The controller according to claim 1, wherein the second direct current external power source is a direct current charging station.

12. The controller according to claim 1, wherein the motor has more than three phase inductive windings, and wherein an additional drive circuit is included for each additional phase inductive winding.

13. The controller according to claim 1, wherein the controller is bidirectional such that in the second state the second direct current external power source or an alternating current external power source are charged by the controller.

14. The controller according to claim 1, wherein the vehicle includes a third input applied across an input circuit for interfacing with an alternating current source.

15. The controller of claim 14, wherein the alternating current source is three phase.

* * * * *